United States Patent
Hato et al.

(10) Patent No.: US 12,025,461 B2
(45) Date of Patent: Jul. 2, 2024

(54) DISPLAY CONTROL DEVICE, DISPLAY CONTROL METHOD, AND NON-TRANSITORY TANGIBLE COMPUTER-READABLE MEDIUM THEREFOR

(71) Applicant: DENSO CORPORATION, Kariya (JP)

(72) Inventors: Takeshi Hato, Kariya (JP); Takashi Ichida, Kariya (JP); Takamitsu Suzuki, Kariya (JP); Yusuke Kondo, Kariya (JP); Kohji Ohyama, Kariya (JP); Kazuki Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 17/397,317

(22) Filed: Aug. 9, 2021

(65) Prior Publication Data

US 2021/0372810 A1    Dec. 2, 2021

Related U.S. Application Data

(63) Continuation of application No. PCT/JP2020/000826, filed on Jan. 14, 2020.

(30) Foreign Application Priority Data

Feb. 14, 2019  (JP) ................................. 2019-024700
Dec. 6, 2019  (JP) ................................. 2019-221593

(51) Int. Cl.
    *G09G 5/38*          (2006.01)
    *B60K 35/00*        (2024.01)
    (Continued)

(52) U.S. Cl.
    CPC ............ *G01C 21/367* (2013.01); *B60K 35/00* (2013.01); *G06T 13/80* (2013.01);
    (Continued)

(58) Field of Classification Search
    CPC ........ G01C 21/367; G06T 13/80; G09G 5/38; G09G 2380/10; B60K 2370/52
    See application file for complete search history.

(56) References Cited

U.S. PATENT DOCUMENTS

| | | | | |
|---|---|---|---|---|
| 2013/0189660 A1* | 7/2013 | Mangum | ................ | G09B 19/00 434/236 |
| 2016/0147073 A1* | 5/2016 | Onda | ................. | G02B 27/0179 345/7 |

(Continued)

FOREIGN PATENT DOCUMENTS

| | | |
|---|---|---|
| DE | 102013224307 A1 | 5/2015 |
| JP | 2017211370 A | 11/2017 |

(Continued)

*Primary Examiner* — Grace Q Li
(74) *Attorney, Agent, or Firm* — Harness, Dickey & Pierce, P.L.C.

(57) ABSTRACT

When the display is controlled by the head-up display used in the vehicle, prior to the display of the superimposed contents to be superimposed and displayed on the specific superimposed object existing in the foreground of the vehicle, the non-superimposed content which has substantially the same meaning as the superposed content to be superimposed and displayed on the foreground in a non-superimposed state on the superimposed object is superimposed and displayed on the foreground.

15 Claims, 28 Drawing Sheets

(51) Int. Cl.
*B60K 35/23* (2024.01)
*B60K 35/28* (2024.01)
*B60K 35/81* (2024.01)
*G01C 21/36* (2006.01)
*G06T 13/80* (2011.01)
*G08G 1/0968* (2006.01)

(52) U.S. Cl.
CPC ......... *G08G 1/096855* (2013.01); *G09G 5/38* (2013.01); *B60K 35/23* (2024.01); *B60K 35/28* (2024.01); *B60K 35/81* (2024.01); *B60K 2360/166* (2024.01); *G09G 2380/10* (2013.01)

(56) References Cited

U.S. PATENT DOCUMENTS

| | | | |
|---|---|---|---|
| 2016/0257199 A1* | 9/2016 | Bark | B60K 35/00 |
| 2016/0327402 A1 | 11/2016 | Funabiki et al. | |
| 2017/0230628 A1* | 8/2017 | Ichikawa | G09G 5/06 |
| 2017/0336222 A1 | 11/2017 | Yamaguchi et al. | |
| 2018/0157036 A1* | 6/2018 | Choi | G02B 27/0179 |
| 2018/0209802 A1 | 7/2018 | Jung | G08G 1/137 |
| 2018/0272948 A1* | 9/2018 | Kumon | B60R 1/12 |
| 2019/0180485 A1* | 6/2019 | Kim | G06T 11/60 |
| 2021/0215499 A1* | 7/2021 | Kassner | G01C 21/367 |

FOREIGN PATENT DOCUMENTS

| | | |
|---|---|---|
| WO | WO-2015118859 A1 | 8/2015 |
| WO | WO-2018070193 A1 | 4/2018 |

\* cited by examiner

DISPLAY CONTROL DEVICE, DISPLAY CONTROL METHOD, AND NON-TRANSITORY TANGIBLE COMPUTER-READABLE MEDIUM THEREFOR

CROSS REFERENCE TO RELATED APPLICATION

The present application is a continuation application of International Patent Application No. PCT/JP2020/000826 filed on Jan. 14, 2020, which designated the U.S. and claims the benefit of priority from Japanese Patent Application No. 2019-024700 filed on Feb. 14, 2019, and No. 2019-221593 filed on Dec. 6, 2019. The entire disclosures of all of the above applications are incorporated herein by reference.

TECHNICAL FIELD

The present disclosure relates to a display control device, a display control method, and a non-transitory tangible computer readable medium that control a display by a head-up display.

BACKGROUND

For example, a conceivable device displays navigation guidance in a vehicle provided with a head-up display. In the conceivable device, when the distance to the intersection is less than the first predetermined distance, the first navigation guide image is displayed. Further, when the distance to the intersection is less than the second predetermined distance, the second navigation guide image is displayed as an augmented reality element.

SUMMARY

According to an example embodiment, when the display is controlled by the head-up display used in the vehicle, prior to the display of the superimposed contents to be superimposed and displayed on the specific superimposed object existing in the foreground of the vehicle, the non-superimposed content which has substantially the same meaning as the superposed content to be superimposed and displayed on the foreground in a non-superimposed state on the superimposed object is superimposed and displayed on the foreground.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
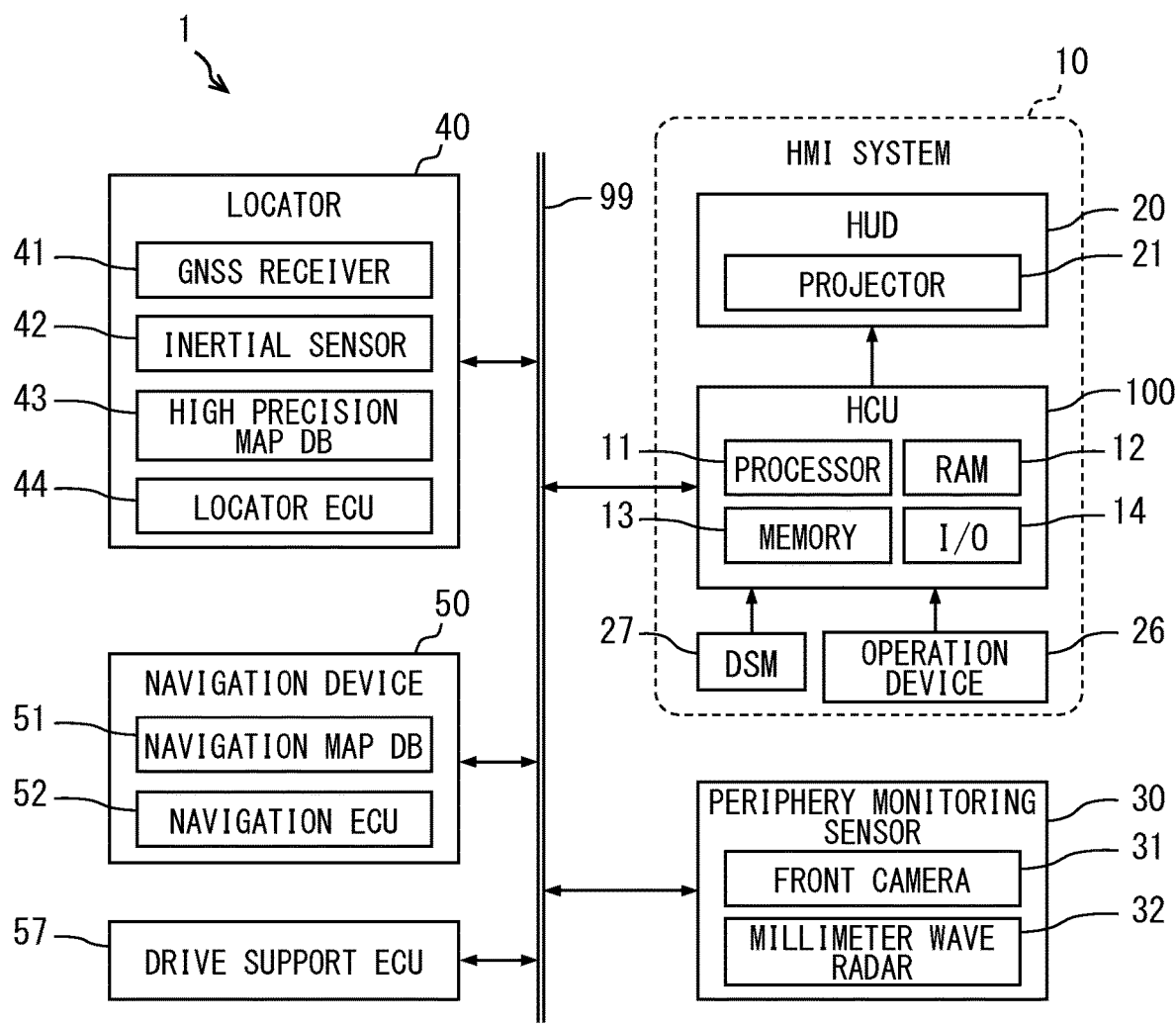
FIG. 1 is a diagram showing an overall image of an in-vehicle network including an HCU according to the first embodiment.

In the conceivable device, the first navigation guidance image guides a right turn at an intersection, while the second navigation guidance image is superimposed and displayed on the road surface as an augmented reality element to guide for going straight through the intersection. As described above, if the navigation guide image with a different content is switched, the user may misunderstand, and the convenience of the user may be impaired.

In view of the above point, a display control device, a display control method, a display control program, and a non-transitory tangible computer readable medium are provided to be capable of presenting highly convenient information.

According to an example embodiment, the display control device used in the vehicle and controlling the display by the head-up display includes: a display generation unit that generates the superimposed content to be superimposed and displayed on the specific superimposed object existing in the foreground of the vehicle, and the non-superimposed content to be superimposed and displayed on the foreground in a non-superimposed state on the superimposed target; and an object position grasping unit that grasps the distance to the specific position related to the superposed target or the time until the vehicle reaches the specific position. Prior to displaying the superposed content, the display generation unit displays the non-superimposed content having substantially the same meaning as the superimposed content, and superimposes and displays the superimposed content on the superimposed object under a condition that the distance or the time grasped by the target position grasping unit is less than the threshold value.

According to an example embodiment, the display control device used in the vehicle and controlling the display by the head-up display includes: a display generation unit that generates the superimposed content to be superimposed and displayed on the specific superimposed object existing in the foreground of the vehicle, and the non-superimposed content to be superimposed and displayed on the foreground in a non-superimposed state on the superimposed target; and a target position determination unit that determines whether or not the superimposed target is disposed within the view angle of the head-up display. Prior to the display of the superimposed content, the display generation unit displays the non-superimposed content having substantially the same meaning as the superimposed content, and superimposes and displays the superimposed content on the superimposed object under a condition that the target position determination unit determines that the superimposed object is disposed within the view angle.

According to an example embodiment, the display control device used in the vehicle and controlling the display by the head-up display includes: a display generation unit that generates the first superimposed content and the second superimposed content, which are different from each other, to be superimposed and displayed on the specific superimposed object existing in the foreground of the vehicle, and the non-superimposed content to be superimposed and displayed on the foreground in a non-superimposed state on the superimposed target; and a target position determination unit that determines whether or not the superimposed target is disposed within the view angle of the head-up display. Prior to the display of the first superimposed content, the display generation unit displays and superimposes the non-superimposed content having substantially the same meaning as the first superimposed content on the second superimposed content which is temporarily displayed on the superposed target in a non-superimposed manner, and displays and superimposes the second superimposed content on the superimposed object under a condition that the target position determination unit determines that the superimposed object is disposed within the view angle, and changes the display manner from the non-superimposed content to the first superimposed content.

According to an example embodiment, a display control program used in a vehicle to control a display by a head-up display causes at least one processor to execute a process including: prior to displaying the superposed content to be superimposed and displayed on the specific superimposing object existing in the foreground of the vehicle, displaying and superimposing the non-superimposed content, having substantially the same meaning as the superimposed content to be superimposed and displayed on the superimposing object of the foreground in a non-superimposed state, on the foreground; grasping the distance to the specific position related to the superposed target or the time until the vehicle reaches the specific position; and superimposing and displaying the superimposed content on the superimposed object under a condition that the distance or the time is less than the threshold value.

According to an example embodiment, a non-transitory tangible computer readable medium includes instructions performed by a computer, and the instructions are used in a vehicle to control a display on a head-up display. The instructions are executed by at least one processor, and the instructions includes: prior to displaying the superposed content to be superimposed and displayed on the specific superimposing object existing in the foreground of the vehicle, displaying and superimposing the non-superimposed content, having substantially the same meaning as the superimposed content to be superimposed and displayed on the superimposing object of the foreground in a non-superimposed state, on the foreground; grasping the distance to the specific position related to the superposed target or the time until the vehicle reaches the specific position; and superimposing and displaying the superimposed content on the superimposed object under a condition that the distance or the time is less than the threshold value.

In these aspects, the superimposed display by the head-up display is changed from the non-superimposed content having substantially the same meaning to the superimposed content. Therefore, even if the information presentation is started early while using the head-up display having a limited angle of view, the user's misunderstanding is unlikely to occur. Therefore, it is possible to present highly convenient information.

According to an example embodiment, the display control program used in the vehicle and controlling the display by the head-up display causes at least one processor to execute a process including: prior to displaying the superposed content to be superimposed and displayed on the specific superimposing object existing in the foreground of the vehicle, displaying and superimposing the non-superimposed content, having substantially the same meaning as the superimposed content to be superimposed and displayed on the superimposing object of the foreground in a non-superimposed state, on the foreground; and superimposing and displaying the superimposed content on the superimposed object under a condition that the superimposed object is disposed within the view angle of the head-up display.

According to an example embodiment, a non-transitory tangible computer readable medium includes instructions performed by a computer, and the instructions are used in a vehicle to control display on a head-up display. The instruction are executed by at least one processor, and the instructions includes: prior to displaying the superposed content to be superimposed and displayed on the specific superimposing object existing in the foreground of the vehicle, displaying and superimposing the non-superimposed content, having substantially the same meaning as the superimposed content to be superimposed and displayed on the superimposing object of the foreground in a non-superimposed state, on the foreground; and superimposing and displaying the superimposed content on the superimposed object under a condition that the superimposed object is disposed within the view angle of the head-up display.

According to an example embodiment, the display control program used in the vehicle and controlling the display by the head-up display causes at least one processor to execute a process including: prior to the display of the first superimposed content to be displayed and superimposed on the specific superimposing object existing in the foreground of the vehicle, displaying and superimposing the non-superimposed content, having substantially the same meaning as the first superposed content to be superimposed and displayed on the superimposed object of the foreground in the non-superimposed manner, on the second superimposed content which is temporarily displayed on the superposed target in a non-superimposed manner; and displaying and superimposing the second superimposed content having the different display form from the first superimposed content on the superimposed object under a condition that the superimposed object is disposed within the view angle of the head-up display; and changing the display manner from the non-superimposed content to the first superimposed content.

According to an example embodiment, a non-transitory tangible computer readable medium includes instructions performed by a computer, and the instructions are used in a vehicle to control display on a head-up display. The instructions are executed by at least one processor, and the instructions include: prior to the display of the first superimposed content to be displayed and superimposed on the specific superimposing object existing in the foreground of the vehicle, displaying and superimposing the non-superimposed content, having substantially the same meaning as the first superposed content to be superimposed and displayed on the superimposed object of the foreground in the non-superimposed manner, on the second superimposed content which is temporarily displayed on the superposed target in a non-superimposed manner; and displaying and superimposing the second superimposed content having the different display form from the first superimposed content on the superimposed object under a condition that the superimposed object is disposed within the view angle of the head-up display; and changing the display manner from the non-superimposed content to the first superimposed content.

In these aspects, prior to the display of the first superimposed content, the non-superimposed content having substantially the same meaning is displayed and superimposed on the second superimposed content being temporarily displayed. Therefore, the meaning of the second superimposed content in a state where it is not superimposed on the superimposed object can be shown to the user by the non-superimposed content. As a result, even if the information presentation is started at an early stage, the user's misunderstanding is unlikely to occur. Therefore, it is possible to present highly convenient information.

Hereinafter, multiple embodiments of the present disclosure will be described with reference to the drawings. Incidentally, the same reference numerals are assigned to corresponding components in each embodiment, and therefore duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. It should be understood that such unspecified combinations of configurations described in various embodiments and variation examples are also disclosed by the following description.

First Embodiment

Figure 2:
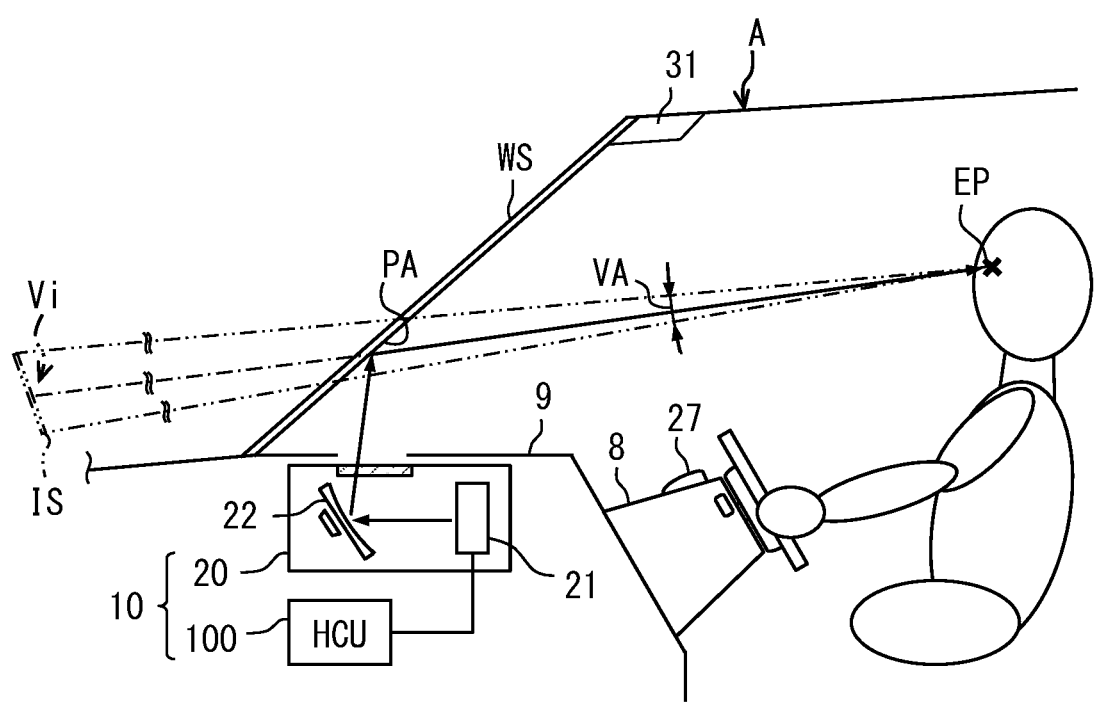
FIG. 2 is a diagram showing an example of a HUD device mounted on a vehicle.

The function of the display control device according to the first embodiment of the present disclosure is realized by the HCU (Human Machine Interface Control Unit) 100 shown in FIGS. 1 and 2. The HCU 100 comprises an HMI (Human Machine Interface) system 10 used in the vehicle A together with a head-up display (hereinafter, "HUD") 20, an operating device 26, a driver status monitor 27, and the like. The HMI system 10 has an input interface function that accepts an operation by an occupant (for example, a driver) of the vehicle A, and an output interface function that presents information to the driver.

The HMI system 10 is communicably connected to the communication bus 99 of the in-vehicle network 1 mounted on the vehicle A. The HMI system 10 is one of a plurality of nodes provided in the in-vehicle network 1. For example, a peripheral monitoring sensor 30, a locator 40, a navigation device 50, a driving support ECU 57 (Electronic Control Unit), and the like are connected to the communication bus 99 of the in-vehicle network 1 as nodes. These nodes connected to the communication bus 99 can communicate with each other.

The periphery monitoring sensor 30 is an autonomous sensor that monitors the peripheral environment of the vehicle A. The peripheral monitoring sensor 30 detects moving objects such as other vehicles, pedestrians, cyclists, non-human animals and the like, and stationary objects such as roadside structures, falling objects on the road, guardrails, curbs, and road markings such as traveling lane markings from the detection range around the vehicle. The peripheral monitoring sensor 30 provides the detection information of detecting an object around the vehicle A (particularly in the front range) to the driving support ECU 57, the HCU 100, and the like through the communication bus 99.

The peripheral monitoring sensor 30 has a front camera 31, a millimeter wave radar 32, and the like as a detection configuration for object detection. The front camera 31 outputs at least one of the imaging data obtained by photographing the front range of the vehicle A and the analysis result of the imaging data as detection information. The millimeter wave radar 32 irradiates a millimeter wave or a quasi-millimeter wave toward the front range, and generates detection information to be output to the external devices by a process of receiving a reflected wave reflected by a moving object, a stationary object, or the like. The peripheral monitoring sensor 30 may include detection configurations such as a rider and a sonar.

The locator 40 generates highly accurate position information and the like of the vehicle A by a complex positioning method that combines a plurality of acquired information. The locator 40 can specify, for example, the lane in which the vehicle A travels (hereinafter, "own vehicle lane") among a plurality of lanes. The locator 40 includes a GNSS (Global Navigation Satellite System) receiver 41, an inertial sensor 42, a high-precision map database (hereinafter, "DB") 43, and a locator ECU 44.

The GNSS receiver 41 receives positioning signals transmitted from a plurality of artificial satellites (i.e., positioning satellites). The GNSS receiver 41 is capable of receiving positioning signals from respective positioning satellites of at least one satellite positioning system among satellite positioning systems such as a GPS, a GLONASS, a Galileo, an IRNSS, a QZSS, and a Beidou.

The inertial sensor 42 includes a gyro sensor and an acceleration sensor, for example. The high-precision map DB 43 is mainly provided in a non-volatile memory, and stores map data (hereinafter, "high-precision map data") with higher accuracy than that used in the navigation device 50. The high-precision map data includes three-dimensional shape information of the road, information on the number of lanes, information indicating the traveling direction allowed for each lane, and the like.

The locator ECU 44 has a configuration mainly including a microcomputer including a processor, a RAM, a storage unit, an input/output interface, a bus connecting them, and the like. The locator ECU 44 combines the positioning signal received by the GNSS receiver 41, the measurement result of the inertial sensor 42, the vehicle speed information output to the communication bus 99, and the like, and sequentially positions the own vehicle position, the traveling direction, and the like of the vehicle A. The locator ECU 44 provides the position information and the direction information of the vehicle A based on the positioning result to the navigation device 50, the HCU 100, and the like through the communication bus 99.

In addition, the locator ECU 44 determines whether or not the required high-precision map data is stored in the high-precision map DB 43 in response to a request from the HCU 100 or the like. When the requested high-precision map data is in the high-precision map DB 43, the locator ECU 44 reads the corresponding high-precision map data from the high-precision map DB 43 and provides it to the request source HCU 100.

The navigation device 50 is an in-vehicle device that cooperates with the HMI system 10 to provide route guidance to a destination set by an occupant. The navigation device 50 includes a map database for navigation (hereinafter, "navigation map DB") 51, a navigation ECU 52, and the like. The navigation map DB 51 mainly includes a non-volatile memory, and comprehensively stores a wider range of map data than the high-precision map DB 43. The navigation map data stored in the navigation map DB 51 includes link data, node data, shape data, and the like for roads.

The navigation ECU 52 has a configuration mainly including a microcomputer including a processor, a RAM, a storage unit, an input/output interface, a bus connecting them, and the like. The navigation ECU 52 acquires the position information and the direction information of the vehicle A from the locator ECU 44 through the communication bus 99.

The navigation ECU 52 acquires the operation information input to the operation device 26 through the communication bus 99 and the HCU 100, and sets the destination based on the user operation. The navigation ECU 52 searches for a plurality of routes to the destination so as to satisfy conditions such as time priority and distance priority. When one of the searched plurality of routes is selected, the navigation ECU 52 provides the route information based on the set route to the HCU 100 through the communication bus 99 together with the related navigation map data.

The driving support ECU 57 includes at least one of a driving support function that assists the driver's driving operation and an automatic driving function that can substitute the driver's driving operation. The driving support ECU 57 recognizes the traveling environment around the vehicle A based on the detection information acquired from the peripheral monitoring sensor 30. The driving support ECU 57 can provide the HCU 100 with the analysis result of the detection information carried out for recognizing the driving environment as the analyzed detection information.

As an example, the driving support ECU 57 provides information extracted from the image data of the front camera 31, specifically, the relative position, a moving speed, a moving direction, and a size and a type of the front vehicle Af (see FIG. 19) existing in the front range to the HCU 100. Further, the driving support ECU 57 provides the HCU 100 with information such as the relative position, a size, and a type of the road sign (see FIG. 12) existing in the front range.

Next, details of the operation device 26, the driver status monitor (hereinafter, "DSM") 27, the HUD 20, and the HCU 100 included in the HMI system 10 will be described in order.

The operation device 26 is an input unit that accepts user operations by a driver or the like. User operations related to, for example, a driving support function or an automatic driving function are input to the operation device 26. Specifically, the operation device 26 includes a steering switch provided on the spoke portion of the steering wheel, an operation lever provided on the steering column portion 8, a voice input device for detecting the driver's utterance, and the like.

The DSM 27 includes a near-infrared light source, a near-infrared camera, and a control unit for controlling them. The DSM 27 is installed in a posture in which the near-infrared camera is directed toward the headrest portion of the driver's seat, for example, on the upper surface of the steering column portion 8 or the upper surface of the instrument panel 9. The DSM 27 captures the head of the driver irradiated with near infrared light by the near infrared light source using a near infrared camera. The images captured by the near infrared camera are analyzed by the control unit. The control unit extracts information such as the position of the eye point EP and the line-of-sight direction from the captured image, and sequentially outputs the extracted state information to the HCU 100.

The HUD 20 is mounted on the vehicle A as one of a plurality of in-vehicle display devices together with a multi-information display, a center information display, and the like. The HUD 20 presents various information related to the vehicle A, such as route information and traffic sign information, to the driver using the virtual image Vi.

The HUD 20 is electrically connected to the HCU 100 and sequentially acquires video data generated by the HCU 100. The HUD 20 is accommodated in a housing space inside the instrument panel 9 below the windshield WS. The HUD 20 projects the light formed as a virtual image Vi toward the projection range PA of the windshield WS. The light projected toward the windshield WS is reflected toward the driver's seat in the projection area PA and is perceived by the driver. The driver visually recognizes the display in which the virtual image Vi is superimposed on the foreground seen through the projection range PA.

The HUD 20 includes a projector 21 and a magnifying optical system 22. The projector 21 has an LCD (Liquid Crystal Display) panel and a backlight. The projector 21 is fixed to the housing of the HUD 20 with the display surface of the LCD panel facing the magnifying optical system 22. The projector 21 displays each frame image of the video data on the display surface of the LCD panel, and transmits and illuminates the display surface with a backlight to emit light to be formed as a virtual image Vi toward the magnifying optical system 22. The magnifying optical system 22 includes at least one concave mirror in which a metal such as aluminum is vapor-deposited on the surface of a base material made of synthetic resin or glass. The magnifying optical system 22 projects the light emitted from the projector 21 onto the upper projection range PA while spreading the light by reflection.

The angle of view VA is set in the HUD 20. When the virtual range in the space where the virtual image Vi can be imaged by the HUD 20 is defined as the image plane IS, the angle of view VA is defined as a view angle based on the virtual line connecting the driver's eye point EP and the outer edge of the image plane IS. The angle of view VA is an angle range in which the driver can visually recognize the virtual image Vi when viewed from the eye point EP. In the HUD 20, the horizontal angle of view (for example, about 10 degrees to 12 degrees) in the horizontal direction is larger than the vertical angle of view (for example, about 4 degrees to 5 degrees) in the vertical direction. When viewed from the eye point EP, the front range that overlaps with the image plane IS is the range within the angle of view VA.

The HUD 20 displays the superimposed content CTs (see FIG. 3 and the like) and the non-superimposed content CTn (see FIG. 3 and the like) as virtual images Vi. The superimposed content CTs is AR display objects used for augmented reality (hereinafter referred to as "AR") display. The display position of the superimposed content CTs is associated with a specific superimposed target Tr (see FIGS. 7 and 12 and the like) existing in the foreground, such as a road surface, a vehicle Af in front, a pedestrian, and a road sign. The superposed content CTs is superimposed and displayed on a specific superposed target Tr, and can be moved in appearance of the driver following the superposed target Tr so as to be relatively fixed to the superposed target Tr. That is, the positional relationship between the driver's eye point EP, the superimposed target Tr in the foreground, and the superimposed content CTs is continuously maintained.

The non-superimposed content CTn is a non-AR display object excluding the superposed content CTs among the display objects superimposed and displayed in the foreground. Different from the superimposed content CTs, the non-superimposed content CTn is superimposed and displayed on the foreground in a non-superimposed state on the specific superimposed target Tr. The display position of the non-superimposed content CTn is not associated with the specific superimposition target Tr. The non-superimposed content CTn is displayed so as to be relatively fixed to the vehicle configuration such as the windshield WS without following the specific superimposition target Tr. Due to the positional relationship between the vehicle A and the superimposed target Tr, even the non-superimposed content CTn may be temporarily superimposed on the superimposed target Tr.

Figure 3:
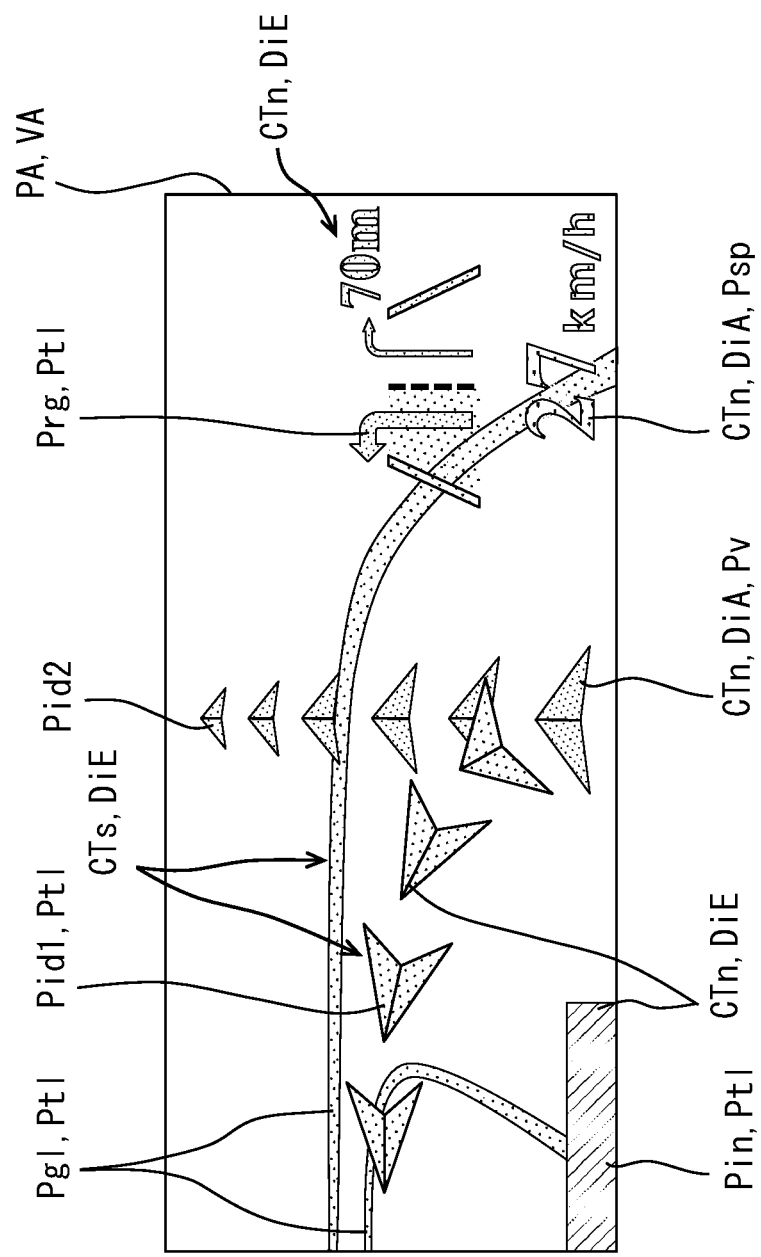
FIG. 3 is a diagram showing a list of non-superimposed contents and a plurality of images displayed as superposed contents.

As shown in FIG. 3, the non-superimposed content CTn includes the constantly displayed object DiA and the event display object DiE. The constantly displayed object DiA is a display object that is substantially always displayed during the activation of the HMI system 10. For example, a speedometer Psp that indicates the traveling speed of the own vehicle, a own vehicle marker Pv that makes the image of the own vehicle, and the like are displayed as a virtual image as a constantly displayed object DiA. The display position and display size of the constantly displayed object DiA may be appropriately changed based on the display state of the superimposed content CTs, preset settings by the user, and the like.

On the other hand, the event display object DiE is a display object that is displayed only for a certain period when a specific event occurs. For example, the event display object DiE related to the route guidance includes the route icon Prg, the traveling direction guide Pid1, and the blinker icon Pin. Further, the event display DiE related to the route guidance further includes the superimposed content CTs such as the guide marking line Pg1 and the traveling direction guide Pid2. The superimposed contents CTs are substantially all event display objects DiE. Among the above event display objects DiE, the route icon Prg, each traveling direction guide Pid1, Pid2, and the guide marking line Pg1 have the same meaning, that is, a left turn image Pt1 indicating that a left turn is made at an intersection. In this way, "showing the same meaning" means that the same information can be presented to the driver. Note that FIG. 3 is a diagram showing a large number of constantly displayed objects DiA and event displayed objects DiE in a list for explanation, and the display state shown in FIG. 3 may not substantially occur in an actual driving scene.

As shown in FIGS. 1 to 4, the HCU 100 is an electronic control device that integrally controls the display by a plurality of in-vehicle display devices including the HUD 20 in the HMI system 10. The HCU 100 mainly includes a computer including a processing unit 11, a RAM 12, a storage unit 13, an input/output interface 14, and a bus connecting them. The processing unit 11 is hardware for arithmetic processing combined with the RAM 12. The processor 11 is configured to include at least one calculation core such as a CPU (Central Processing Unit) and a GPU (Graphics Processing Unit). The processing unit 11 may be configured to further include an FPGA (Field-Programmable Gate Array), an IP core having other dedicated functions, and the like. The processing unit 11 accesses the RAM 12 to execute various processes for realizing the functions of the respective functional units. The storage unit 13 includes a nonvolatile storage medium. Various programs (display control programs, etc.) executed by the processing unit 11 are stored in the storage unit 13.

The HCU 100 is provided with a plurality of functional units by executing the program stored in the storage unit 13 by the processing unit 11. Specifically, the HCU 100 is constructed with functional units such as a viewpoint position specifying unit 71, a route information acquisition unit 72, a position information acquisition unit 73, an external information acquisition unit 74, a virtual layout unit 75, and a display generation unit 77.

The viewpoint position specifying unit 71 acquires the detection information related to the eye point EP of the driver seated in the driver's seat from the DSM 27. The viewpoint position specifying unit 71 identifies the position of the eye point EP of the current driver based on the detection information acquired from the DSM 27. The viewpoint position specifying unit 71 generates three-dimensional coordinates (hereinafter, "eye point coordinates") indicating the position of the specified eye point EP position, and provides the generated eye point coordinates to the virtual layout unit 75.

When the destination is set in the navigation device 50, the route information acquisition unit 72 acquires the route information for route guidance to the destination and the navigation map data used for the route guidance from the navigation ECU 52. In addition, the route information acquisition unit 72 acquires the guidance execution request output by the navigation ECU 52 together with the route information, the navigation map data, and the like based on the approach of the vehicle A to the guidance area.

The route information acquisition unit 72 can perform a process of acquiring high-precision map data from the locator 40 together with the navigation map data or in place of the navigation map data. The route information acquisition unit 72 requests the locator ECU 44 to provide related high-precision map data based on the route information acquired from the navigation ECU 52. When the high-precision map data requested in this way is stored in the high-precision map DB 43, the route information acquisition unit 72 acquires the high-precision map data returned from the locator ECU 44.

The position information acquisition unit 73 acquires the latest position information and direction information of the vehicle A from the locator ECU 44 as the own vehicle position information. The position information acquisition unit 73 provides the acquired vehicle position information to the virtual layout unit 75.

The external information acquisition unit 74 acquires detection information about the front range of the vehicle A from at least one of the peripheral monitoring sensor 30 and the driving support ECU 57. The detection information may be image data of the front range taken by the front camera 31, or may be an analysis result obtained by recognizing the driving environment by the peripheral monitoring sensor 30 or the driving support ECU 57. Such detection information includes at least detection information such as a preceding vehicle Af (see FIG. 19) and a road sign (see FIG. 12). Based on the acquired detection information, the external information acquisition unit 74 determines whether or not the preceding vehicle in front Af, the road sign, or the like exists in the front range. The external information acquisition unit 74 provides the virtual layout unit 75 with a determination result indicating the presence/absence of the vehicle in front Af and the road sign.

The virtual layout unit 75 has a content selection function and a virtual layout function. The content selection function is a function of selecting content to be used for information presentation based on various information provided to the virtual layout unit 75. Using the content selection function, the information having the high urgency and importance is presented to the driver. The virtual layout unit 75 sets the display and non-display of each content included in the event display object DiE by the content selection function.

When the route information acquisition unit 72 acquires the guidance implementation request, the virtual layout unit 75 selects the content to be used for the route guidance based on the set route. Specifically, content that guides turning left and right at a branch point such as an intersection, content that guides straight ahead for a predetermined distance, content that guides traffic regulation and the occurrence of an accident vehicle, etc. are appropriately selected as content for route guidance. Further, when the road sign is recognized by the external information acquisition unit 74, the virtual layout unit 75 selects the content associated with the recognized road sign and the content in a mode imitating the road sign.

When displaying the superimposed content CTs as the event display object DiE, the virtual layout unit 75 specifies the superimposed target Tr of the superimposed content CTs, and further grasps the distance to the specific position related to the superimposed target Tr. Specifically, when performing right/left turn guidance at an intersection or the like, the virtual layout unit 75 grasps the remaining distance Dr to the reference position GP of the intersection based on the map data obtained by the route information acquisition unit 72 and the latest position information acquired by the position information acquisition unit 73. The reference position GP is set at the center node of the intersection, the node in front of the intersection, or the like as the superposition target Tr. The virtual layout unit 75 sequentially changes the content to be selected as the display target according to the remaining distance Dr from the own vehicle to the reference position GP.

The virtual layout function is a function that simulates the display layout of the superimposed content CTs based on various information provided to the virtual layout unit 75. As shown in FIGS. 1 to 5, the virtual layout unit 75 reproduces the current driving environment of the vehicle A based on the map data obtained by the route information acquisition unit 72 and the latest own vehicle position information acquired by the position information acquisition unit 73. Specifically, the virtual layout unit 75 maps the road shape indicated by the map data to a virtual three-dimensional space, and arranges the own vehicle object AO at the position indicated by the own vehicle position information. The virtual layout unit 75 sets the virtual camera position CP and the superimposition range SA in association with the own vehicle object AO.

The virtual camera position CP is a virtual position corresponding to the driver's eye point EP. The virtual layout unit 75 can correct the virtual camera position CP with respect to the own vehicle object AO based on the eye point coordinates acquired by the viewpoint position specifying unit 71. In addition, the virtual camera position CP may be corrected using attitude information particularly related to the vehicle attitude in the pitch direction. The superimposition range SA is a range in which the virtual image Vi can be superposed by the HUD 20. The virtual layout unit 75 sets the front range inside the outer edge of the image plane IS as the superimposition range SA when viewing forward from the virtual camera position CP based on the virtual camera position CP and the outer edge position (i.e., coordinates) information of the image plane IS stored in advance in the storage unit 13 or the like. The superimposition range SA corresponds to the angle of view VA of HUD20.

The virtual layout unit 75 arranges a virtual object VO corresponding to the display shape in the virtual space when the superimposed content CTs selected as the display target is superimposed and displayed on the superimposed target Tr. The virtual object VO is superposed and arranged on the position of the superimposition target Tr reproduced in the virtual space. When, for example, the guide lane marking line Pg1 is selected as the display target, the virtual layout unit 75 arranges a pair of virtual objects VO extending in a strip shape along the planned route on the intersection in the virtual space and the road surface around the intersection. Further, when the traffic sign image Pts (see FIG. 12) for notifying the road sign is selected as the display target, the virtual layout unit 75 arranges the virtual object VO at the position of the road sign in the virtual space. The virtual layout unit 75 provides the display generation unit 77 with the content selection result and the layout information as a simulation result using the virtual space.

The display generation unit 77 controls the presentation of information to the driver by the HUD 20 by a process of generating video data that is sequentially output to the HUD 20. The display generation unit 77 has a function of drawing contents based on various acquired information. The display generation unit 77 determines the original image to be drawn on each frame image constituting the video data based on the selection result of the content acquired from the virtual layout unit 75.

The display generation unit 77 cooperates with the virtual layout unit 75, and switches between the information presentation using the non-superimposed content CTn and the information presentation using the superposed content CTs based on the remaining distance Dr to the reference position GP grasped by the virtual layout unit 75. Information presentation using such display of non-superimposed content CTn and superposed content CTs in combination will be described with reference to FIGS. 1 and 4 based on FIGS. 6 to 12.

Figure 11:
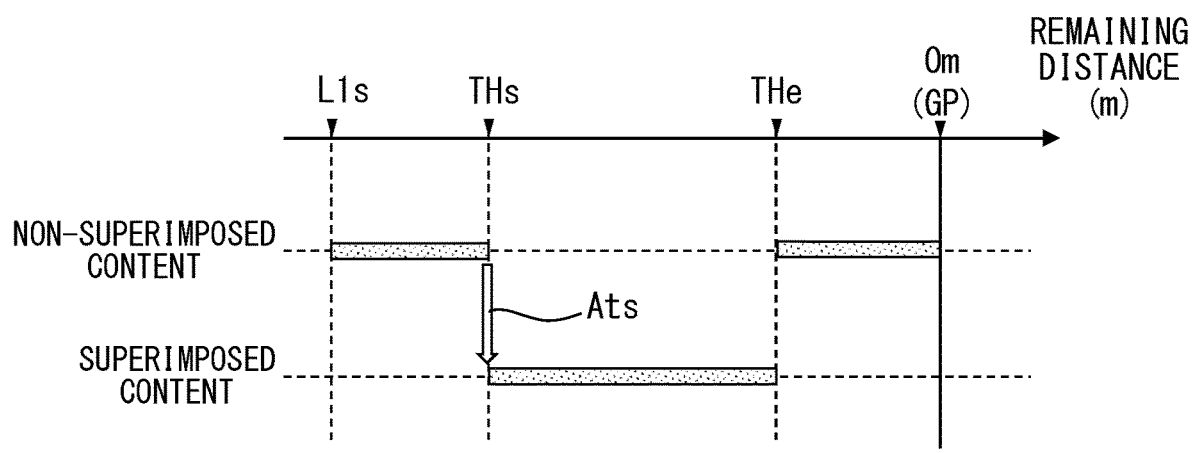
FIG. 11 is a timing chart showing details of transition between non-superimposed content and superposed content in a display related to road sign assist.
Figure 12:
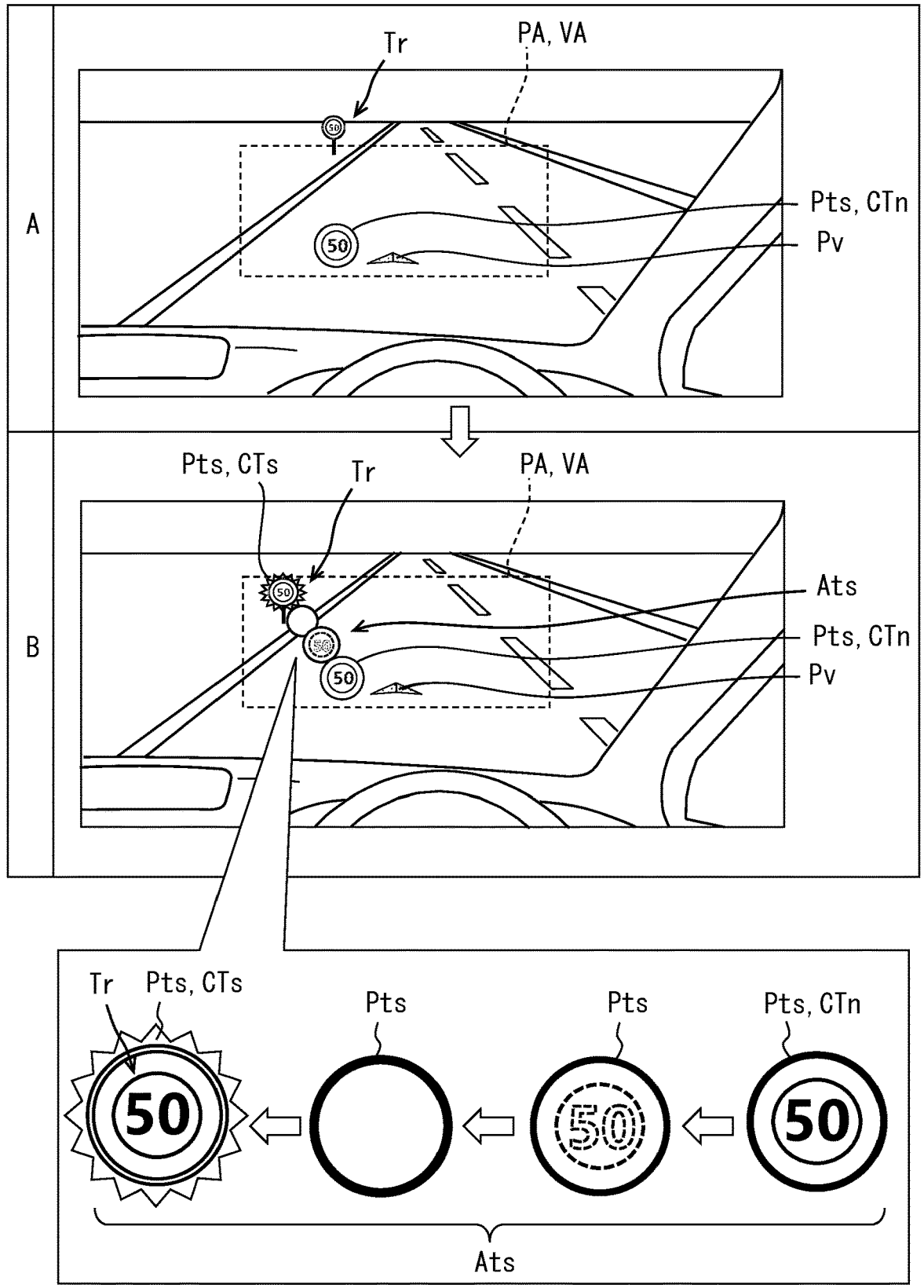
FIG. 12 is a diagram showing a series of display transitions that call attention to road signs.

The information presentation shown in FIGS. 6 to 10 below is an example of a case where the destination is set in the navigation device 50, and is a display transition in a scene where the driver is guided to an intersection at which the vehicle is to turn left. On the other hand, the information presentation shown in FIGS. 11 and 12 is an example of road sign assist that alerts the driver to a road sign. In FIGS. 7 to 9 and 12, the description of the speedometer Psp (see FIG. 3) is not shown.

Figure 7:
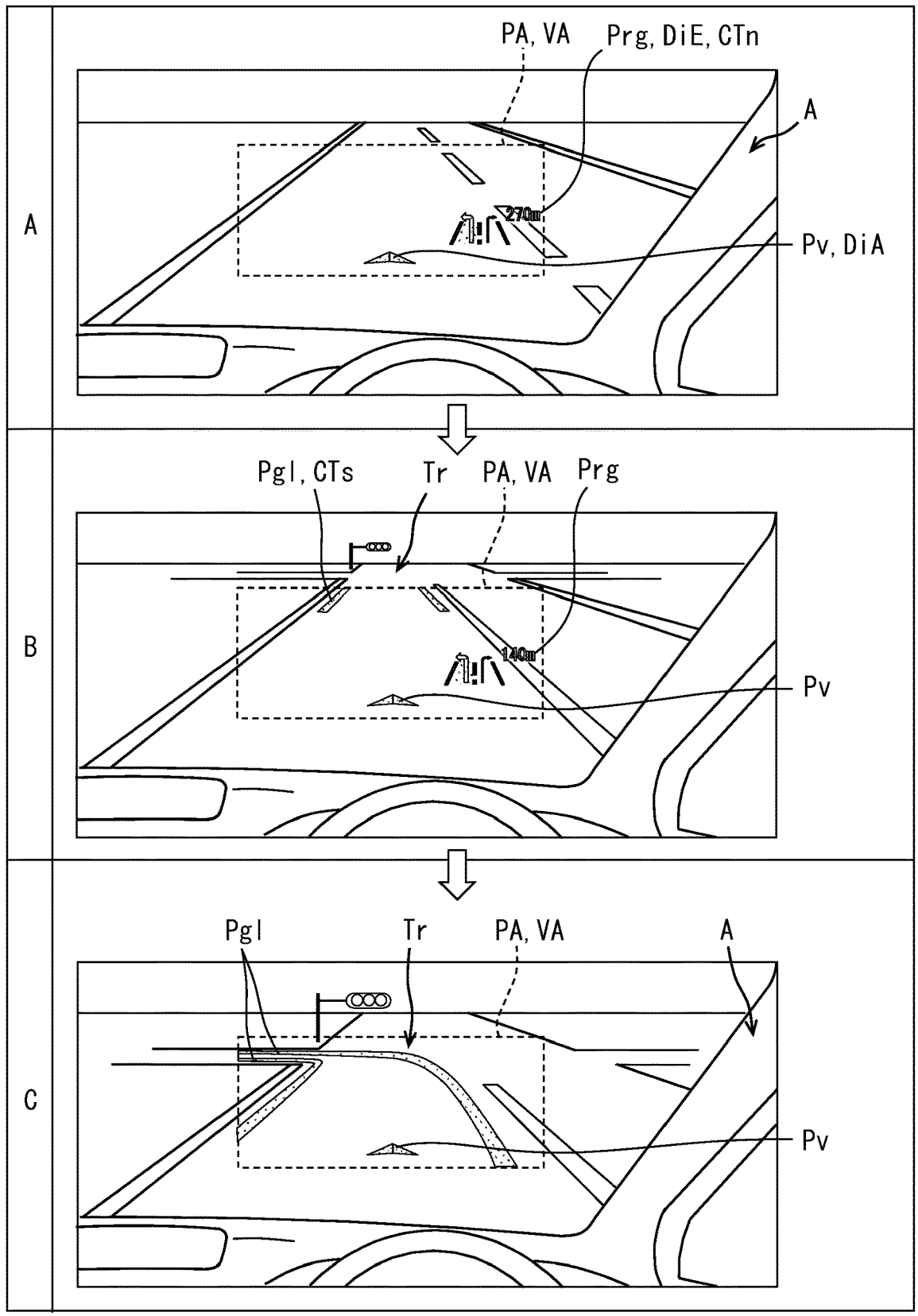
FIG. 7 is a diagram showing a series of display transitions for performing a left turn guidance at an intersection together with FIG. 8.
Figure 8:
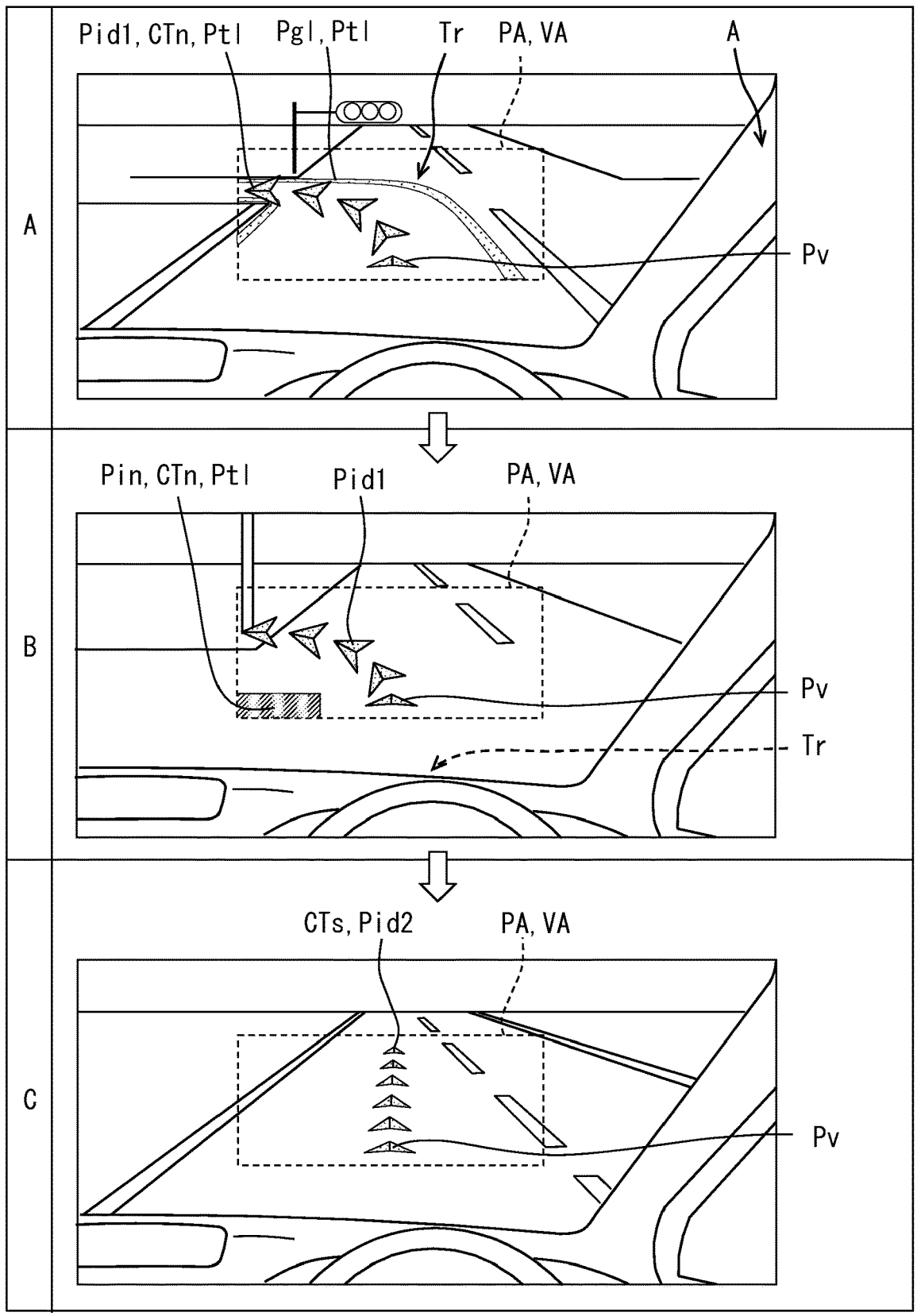
FIG. 8 is a diagram showing a series of display transitions for providing left turn guidance at an intersection together with FIG. 7.

In the left turn guidance shown in FIGS. 6 to 10, when the route information acquisition unit 72 acquires the superimposition execution request, the display generation unit 77 adds the event display object DiE which is the route icon Prg in addition to the own vehicle marker Pv which is the constant display object DiA (see FIG. 7A). The route icon Prg is started to be displayed, for example, at a position where the remaining distance Dr is about 300 meters (see the first start distance L1s in FIG. 6). The route icon Prg is a non-superimposed content CTn indicating the remaining distance Dr to the reference position GP of the intersection, the direction of turning left or right recommended at the intersection, the lane recommended to travel, and the like. The route icon Prg may be displayed in the upper right corner of the vehicle marker Pv, or may be displayed in the center of the angle of view VA. Further, the route icon Prg may be displayed in the center of the angle of view VA and then moved to the upper right corner of the own vehicle marker Pv.

The display generation unit 77 uses the layout information provided by the virtual layout unit 75 based on the condition that the remaining distance Dr grasped by the virtual layout unit 75 is less than the superposition threshold THs, and starts drawing on the original image of the guide lane marking line Pg1 (see FIG. 7B). The guide lane marking line Pg1 has a pair of strip-shaped image portions superimposed on the inner road surface of the marking lines on both the left and right sides. The guide lane marking line Pg1 informs the driver of the planned route of the own vehicle based on the route information by the two-line display shape extending in the traveling direction along the road surface. The superimposition threshold THs is set based on the shape of the angle of view VA of the HUD20, and specifically, the road surface range that is the superimposition target Tr of the guide lane marking line Pg1 is set to the distance at which the superimposition range SA of the HUD20 begins to overlap (see FIG. 5). As an example, the superimposition threshold THs is set to about 150 m.

The display generation unit 77 ends the display of the route icon Prg when the remaining distance Dr becomes less than the first end distance Lie (for example, about 130 m) (see FIG. 7C). The first end distance Lie is set to a distance shorter than the superposition threshold THs. In other words, the superposition threshold THs is set to a distance shorter than the first start distance Lis and longer than the first end distance L1e. By setting each of these distances, the display generation unit 77 starts displaying the route icon Prg having substantially the same meaning as the guide lane marking line Pg1 prior to displaying the guide lane marking line Pg1. Then, the display generation unit 77 starts the display of the guide lane marking line Pg1, temporarily displays the guide lane marking line Pg1 and the route icon Prg at the same time, and then ends the display of the route icon Prg. As an example, the display of the route icon Prg is terminated at the timing when the road to be exited from the intersection enters the angle of view VA.

The display generation unit 77 displays the traveling direction guide Pid1 based on the condition that the remaining distance Dr becomes the second starting distance L2s (for example, about 30 m) (see FIG. 8A). The traveling direction guide Pid1 is a non-superimposed content CTn having a display form different from that of the route icon Prg. The traveling direction guide Pid1 is a left turn image Pt1 showing substantially the same meaning as the route icon Prg and the guide lane marking line Pg1, and is integrated with the own vehicle marker Pv to notify the driver of the recommended traveling direction indicated by the route information. The traveling direction guide Pid1 is displayed as an animation in which a triangular marker substantially the same as the own vehicle marker Pv is repeatedly flown from above the own vehicle marker Pv toward the left edge of the angle of view VA.

The display generation unit 77 ends drawing on the original image of the guide lane marking line Pg1 based on the condition that the remaining distance Dr becomes less than the end threshold value THe (for example, about 20 m) (see FIG. 8B). The end threshold value THe is set to a distance at which substantially the entire road surface range that is the superimposition target Tr of the guide lane marking line Pg1 deviates from the superimposition range SA of the HUD 20. In addition, the end threshold THe is set to a distance shorter than the second start distance L2s. Therefore, the display generation unit 77 ends the display of the guide lane marking line Pg1 after starting the display of the traveling direction guide Pid1.

The display generation unit 77 controls the display of the blinker icon Pin based on the operation information of the direction indicator mounted on the vehicle A. The blinker icon Pin is displayed in a horizontally long rectangular shape in the lower left corner or the lower right corner of the angle of view VA. The blinker icon Pin is a left turn image Pt1 similar to the guide lane marking line Pg1 and the like, and is displayed as an animation that continuously moves to the left. The display generation unit 77 starts displaying the winker icon Pin based on the blinker ON signal information (see "ON" in blinker in FIG. 6) (see FIG. 8B).

The display generation unit 77 ends the display of the traveling direction guide Pid1 at the timing when the vehicle A reaches the intersection and the remaining distance Dr becomes substantially zero. Further, the display generation unit 77 ends the display of the blinker icon Pin based on the blinker OFF signal information (see "OFF" in blinker in FIG. 6). The display generation unit 77 may end the display of the blinker icon Pin based on the position of the own vehicle deviating from the section of the intersection node in the map data.

Based on the end of the display of the blinker icon Pin, the display generation unit 77 starts drawing on the original image of the traveling direction guide Pid2 using the layout information provided by the virtual layout unit 75 (see FIG. 8C). The display end of the blinker icon Pin and the display start of the traveling direction guide Pid2 are continuous. The traveling direction guide Pid2 is a display similar to the traveling direction guide Pid1 displayed when entering an intersection, and similar to the traveling direction guide Pid1, is integrated with the own vehicle marker Pv and notifies the driver of the recommended traveling direction indicated by the route information. The traveling direction guide Pid2 is superimposed content CTs, and is superimposed on the lane in which the own vehicle should travel (hereinafter, "recommended traffic lane") based on the route information. The traveling direction guide Pid2 is displayed as an animation in which a marker substantially the same as the own vehicle marker Pv is repeatedly flown from above the own vehicle marker Pv toward the upper edge of the angle of view VA. The display generation unit 77 ends the display of the traveling direction guide Pid 2 when the predetermined number of repetitions is completed or when travelling by the predetermined distance from the reference position GP.

In the route guidance scene at a continuous intersection, the traveling direction guide Pid2 after passing through the first intersection may be terminated at the timing when the route information of the second intersection is acquired. Further, the traveling direction guide Pid2 may not be the superimposed content CTs superimposed on the road surface of the recommended traffic lane, and may be the non-superimposed content CTn displayed at a specific position in the angle of view VA similar to the traveling direction guide Pid1.

Further, the display generation unit 77 may be able to change the line width of the guide lane marking line Pg1 (see FIG. 7C). When the guide lane marking line Pg1 is too thick, the tips of the two linear image portions superimposed on the exit road from the intersection may overlap with each other and be visually recognized as one linear image. In order to avoid such a situation, the display generation unit 77 can adjust the thickness of the guide lane marking line Pg1 so that the portion superimposed on the exit road is surely visually recognized as two lines. According to the above, for example, the line width of the guide lane marking line Pg1 displayed on an uphill is narrower than the line width of the guide lane marking line Pg1 displayed on a downhill.

Figure 9:
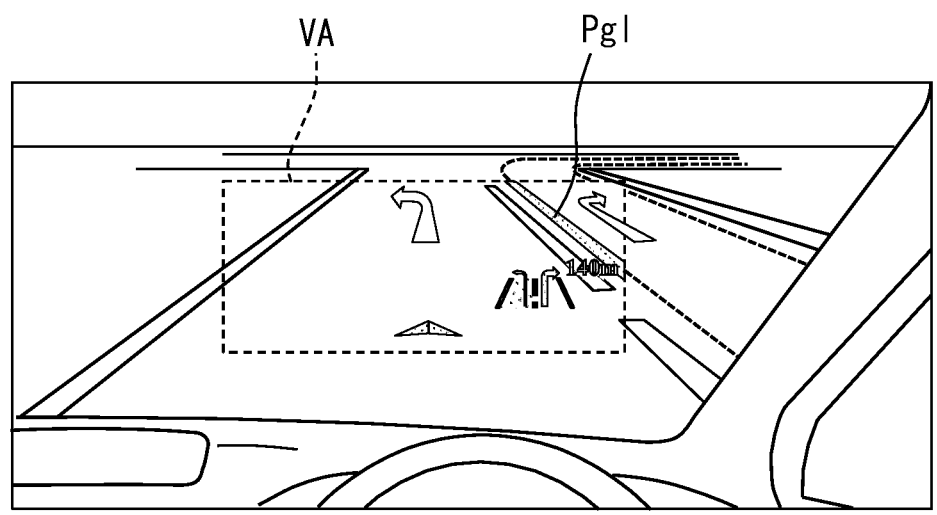
FIG. 9 is a diagram showing a display of a guide lane marking when traveling in an erroneous lane.

Further, as shown in FIG. 9, the guide lane marking line Pg1 is superimposed only on the recommended traffic lanes recommended for traveling based on the route information among the plurality of lanes in front of the intersection, and not superimposed on the non-recommended traffic lanes disposed outside of the route. Therefore, when the own vehicle is traveling in the wrong traffic lane and the recommended lane is adjacent to the current own vehicle lane, the guide lane marking line Pg1 is superimposed and displayed on the recommended traffic lane overlapping the angle of view VA. With such a display, the guide lane marking line Pg1 can make the driver aware of a mistake in the traffic lane.

Figure 10:
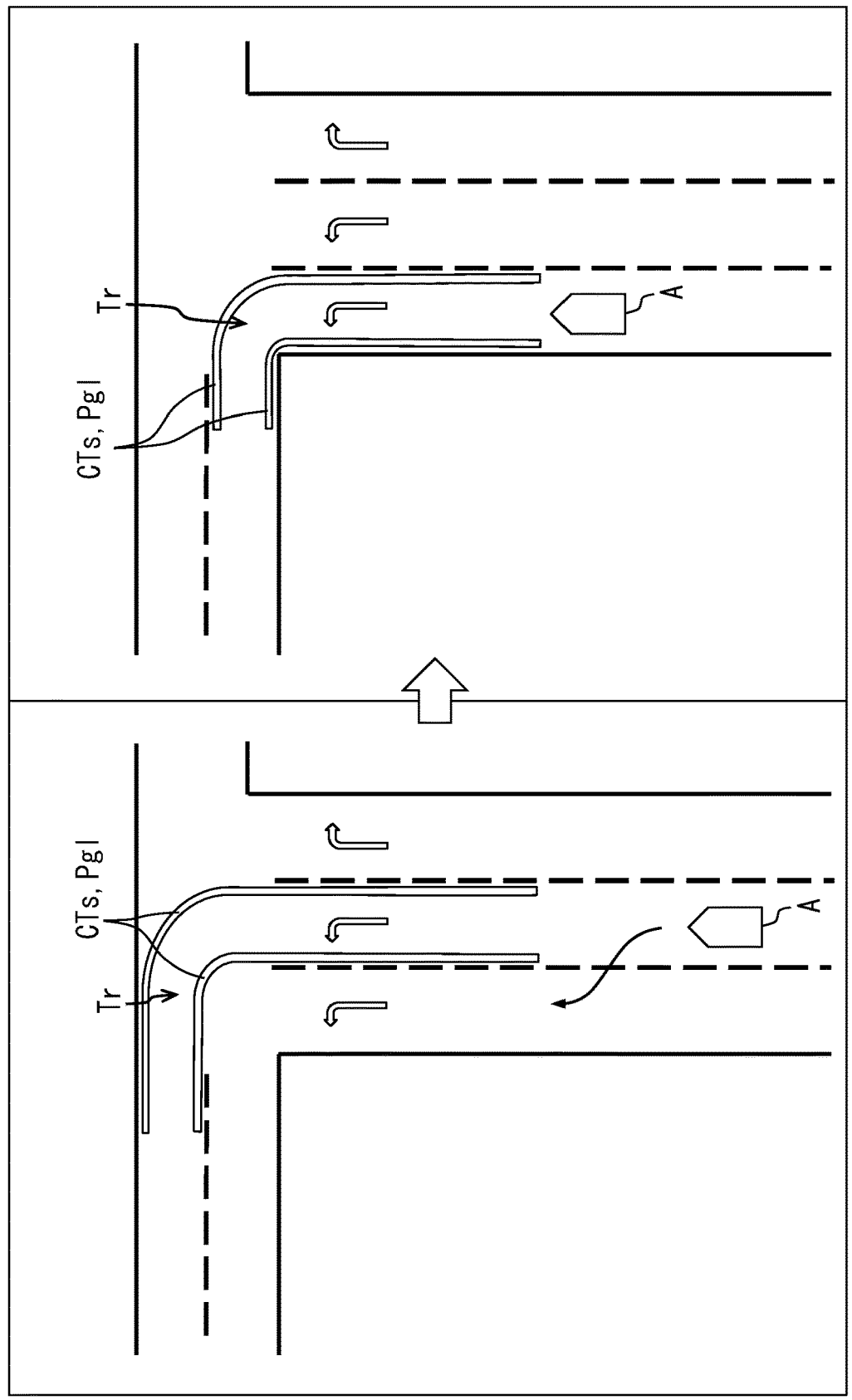
FIG. 10 is a diagram showing the movement of a guide lane marking when the vehicle changes a lane in front of an intersection.

Further, as shown in FIG. 10, when there are a plurality of left turn lanes, the external information acquisition unit 74 can acquire lane information specifying the own vehicle lane from the locator 40. Alternatively, the virtual layout unit 75 may be able to identify the own vehicle lane by appropriately combining the detection information of the front camera 31, the high-precision map data, the own vehicle position information, and the like. The display generation unit 77 superimposes and displays the guide lane marking line Pg1 (i.e., the superimposed content CTs) only on the specified own vehicle lane even when there are a plurality of lanes matching the set route. That is, the display generation unit 77 does not display the superimposed content CTs in the other lanes other than the own vehicle lane.

As described above, when the vehicle A changes the traffic lane before the intersection, the display generation unit 77 switches the lane to be the superposition target Tr of the guide lane marking line Pg1 at the change timing of the own vehicle lane specified by the virtual layout unit 75. At this time, when the non-superimposed content CTn such as the route icon Prg can notify the own vehicle lane, the display generation unit 77 also changes the notification content of the non-superimposed content CTn so as to synchronize with the movement of the superposed content CTs when determining that the traffic lane change has been performed. When the superimposition target Tr of the guide lane marking line Pg1 is limited to the own vehicle lane, the superimposition content CTs can contribute to ensuring the driver's field of view. As a result, the driver can easily see the actual attention target existing in the vicinity of the intersection.

In the traffic sign notification shown in FIGS. 11 and 12, the display generation unit 77 displays the traffic sign image Pts imitating the road sign as a virtual image in the angle of view VA in the display form of either the superposed content CTs or the non-superimposed content CTn. The traffic sign image Pts as the superimposed content CTs is displayed by superimposing the actual road sign as the superimposing target Tr on the road sign. The virtual layout unit 75 sets the installation position of the road sign, which is the superposition target Tr, as the reference position GP, and grasps the remaining distance Dr from the own vehicle to the reference position GP.

At the timing when the detection information of the road sign is acquired by the external information acquisition unit 74 (see L1s in FIG. 11), the road sign to be superimposed is visually recognized above the angle of view VA when viewed from the driver. Since the signboard-shaped road sign is not included in the angle of view VA, the display generation unit 77 displays the traffic sign image Pts, which is the non-superimposed content CTn imitating the road sign (see FIG. 12A). The traffic sign image Pts is displayed on the left side of the own vehicle marker Pv, for example.

When the remaining distance Dr grasped by the virtual layout unit 75 becomes less than the superposition threshold THs (see FIG. 11), the display generation unit 77 starts displaying the transition animation Ats (see FIG. 12B). Even in this case, the superposition threshold THs is set at a position where the road sign is within the angle of view VA. Therefore, the transition animation Ats is started before and after the timing when the road sign enters the angle of view VA.

The transition animation Ats is a content that continuously transitions the display state of the traffic sign image Pts from the non-superimposed content CTn to the superimposed content CTs. In the transition animation Ats, the traffic sign image Pts changes to the superimposed content CTs by being superimposed and displayed on the actual road sign while moving from the vicinity of the own vehicle marker Pv toward the superimposed target Tr. According to such a transition animation Ats, the display generation unit 77 can start the display of the superposed content CTs when the display of the non-superimposed content CTn is finished.

In addition, in the transition animation Ats, the central portion showing the content of the road sign disappears, and the traffic sign image Pts changes to a simple ring-shaped image. The ring-shaped traffic sign image Pts is superimposed and displayed on the outer edge of the road sign in the foreground as the superimposed content CTs, and the signboard of the road sign is emphasized by light emission.

When the remaining distance Dr to the road sign becomes less than the end threshold value THe (see FIG. 11), the display generation unit 77 ends the display of the traffic sign image Pts as the superimposed content CTs. The end threshold value THe is set at a position where the road sign goes out of the angle of view VA. As a result, the traffic sign image Pts (see FIG. 12A) as the non-superimposed content CTn is redisplayed before and after the timing when the road sign goes out of the angle of view VA. The display of such traffic sign image Pts continues until the vehicle leaves the effective section of the road sign. As an example, when the own vehicle reaches the road sign, the display generation unit 77 ends the display of the traffic sign image Pts.

Figure 4:
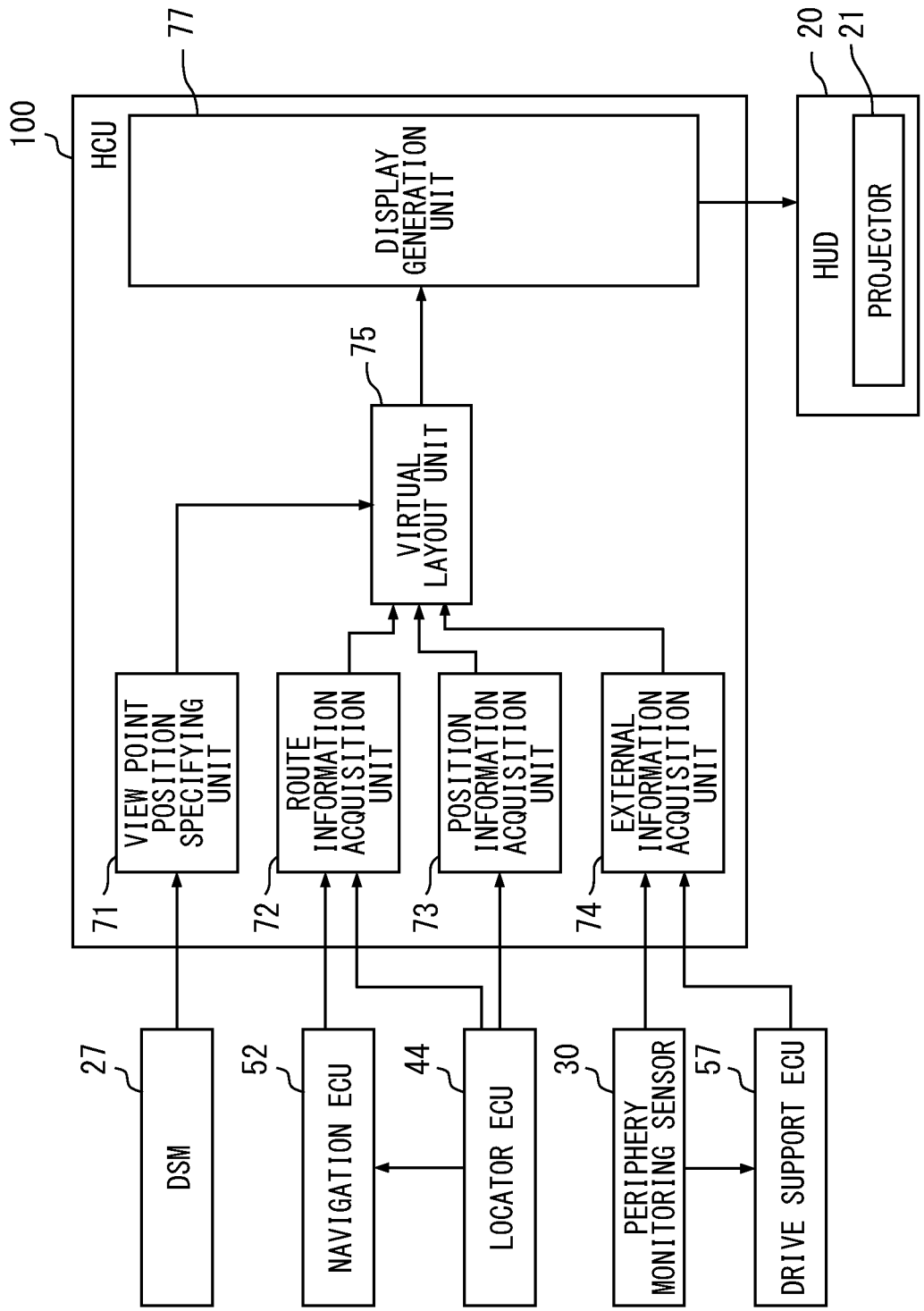
FIG. 4 is a diagram showing an example of a schematic configuration of an HCU.
Figure 5:
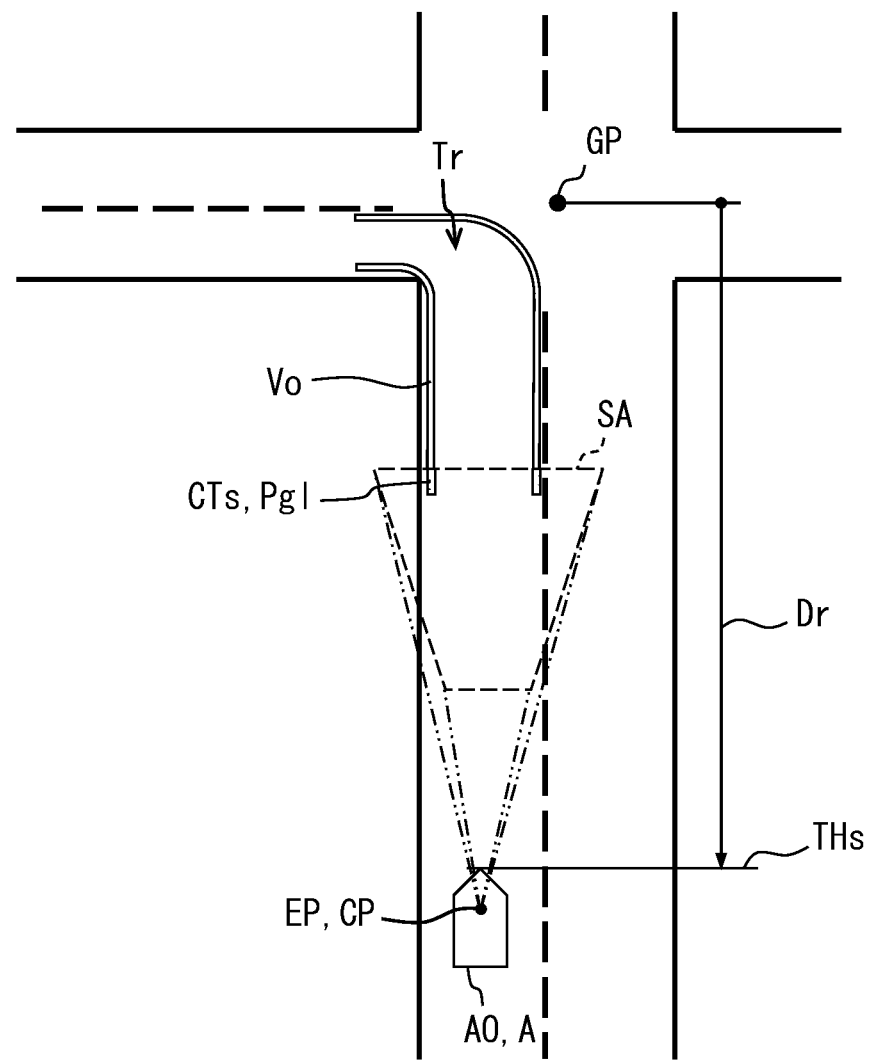
FIG. 5 is a diagram showing an example of a display layout simulation performed by the virtual layout unit to be visualized.
Figure 6:
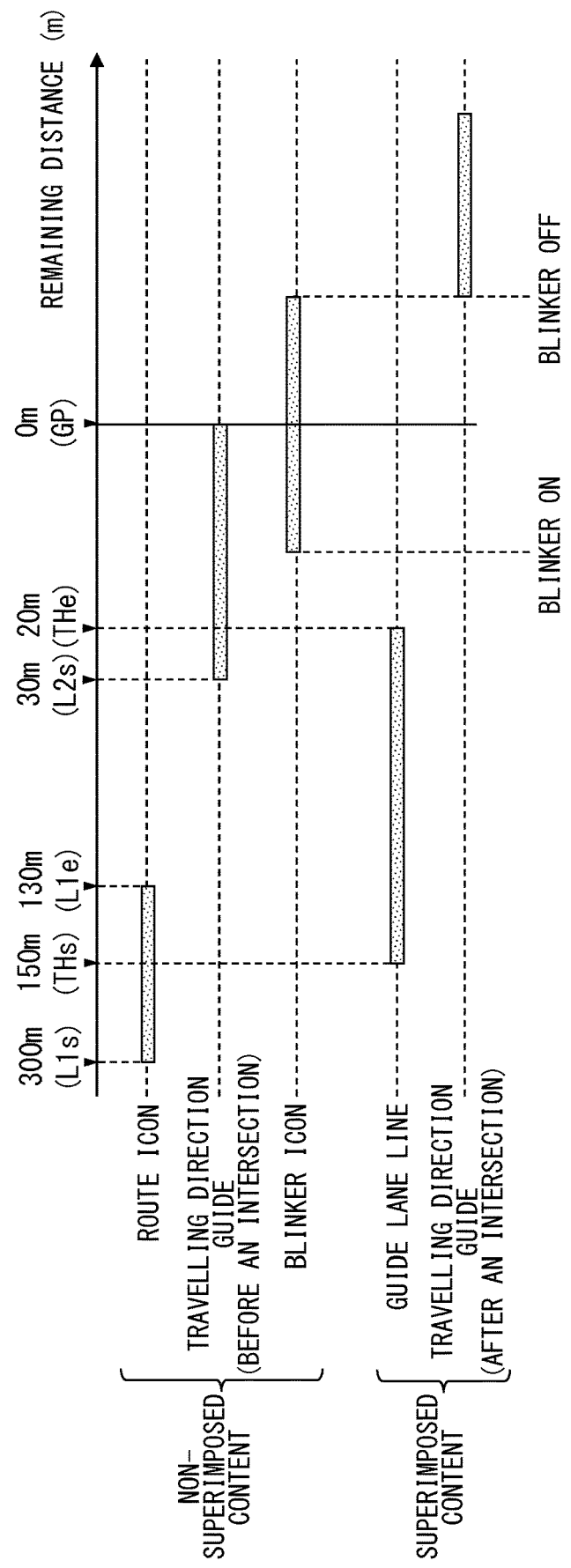
FIG. 6 is a diagram showing a display section of an event display object related to left turn guidance in relation to a remaining distance to a reference position and the like, and is a timing chart showing details of transition between non-superimposed content and superposed content.

Next, the details of the display processing performed by the HCU 100 in order to realize the information presentation described above will be described below with reference to FIG. 4 and the like based on the flowcharts shown in FIGS. 13 and 14, respectively.

Figure 13:
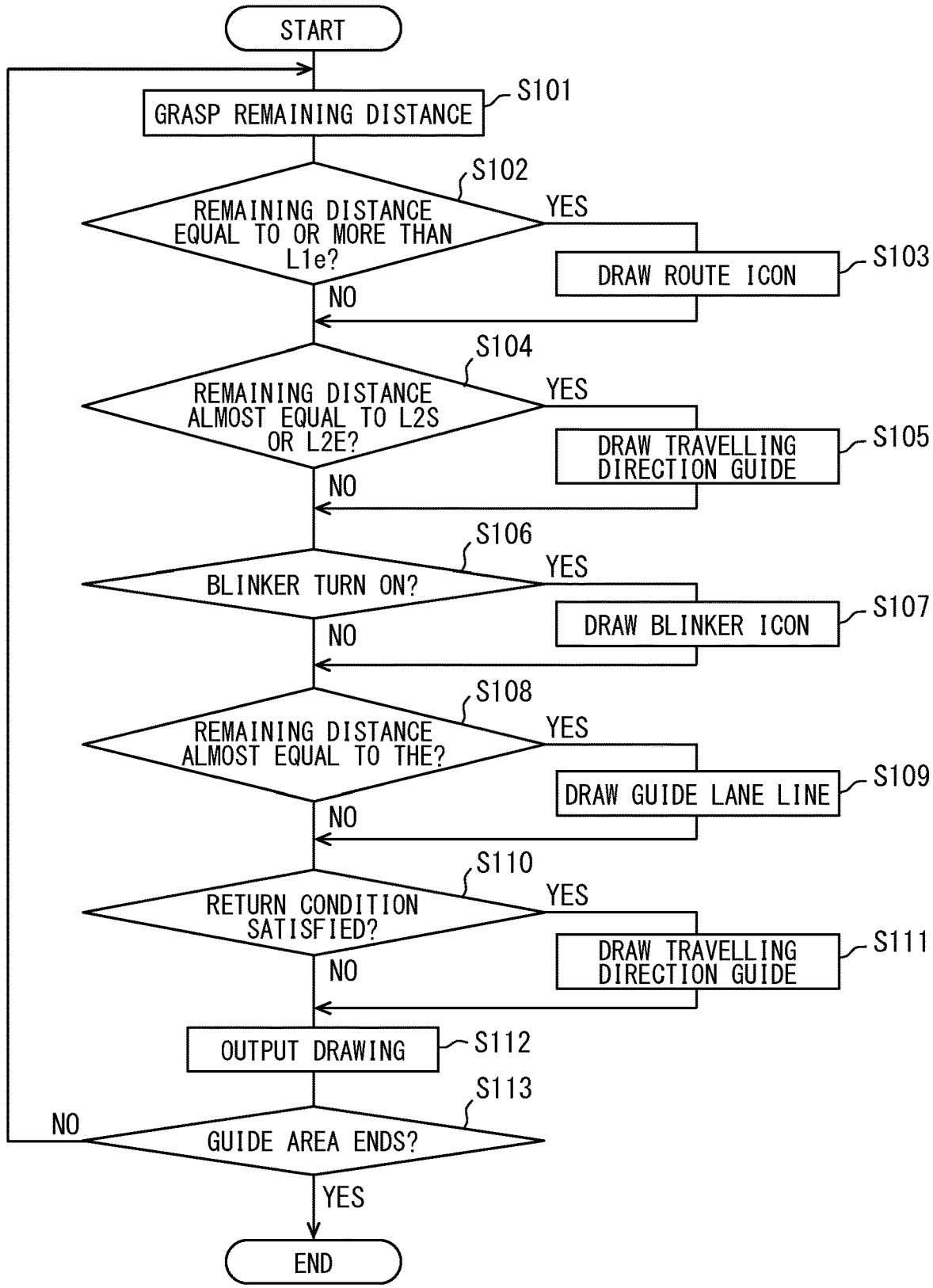
FIG. 13 is a flowchart showing details of display processing for route guidance.

The display process shown in FIG. 13 is started by the HCU 100 based on the acquisition of the guidance execution request by the route information acquisition unit 72. In S101 in such a display process for route guidance, the remaining distance Dr to the reference position GP of the intersection or the like to be the guide target is grasped, and the process proceeds to S102. In S102, it is determined whether or not the remaining distance Dr grasped in S101 is equal to or greater than the first end distance L1e. When the remaining distance Dr is less than the first end distance L1e, the process proceeds from S102 to S104. On the other hand, when the remaining distance Dr is equal to or greater than the first end distance L1e, the process proceeds from S102 to S103. In S103, the route icon Prg is set to be drawn on the frame image, and the process proceeds to S104.

In S104, it is determined whether or not the remaining distance Dr grasped in S101 is between the second start distance L2s and the second end distance L2e. When the remaining distance Dr is the second start distance L2s or more, or when the remaining distance Dr is less than the second end distance L2e, the process proceeds from S104 to S106. On the other hand, when the remaining distance Dr is less than the second start distance L2s and is greater than or equal to the second end distance L2e, the process proceeds from S104 to S105. In S105, the traveling direction guide Pid1 is set to be drawn on the frame image, and the process proceeds to S106.

In S106, it is determined whether or not the direction indicator is in the ON state. When it is determined that the blinker is in the off state, the process proceeds from S106 to S108. On the other hand, when it is determined that the blinker turns on, the process proceeds from S106 to S107. In S107, the blinker icon Pin is set to be drawn on the frame image, and the process proceeds to S108. When the right turn signal is in the on state, the blinker icon Pin flowing to the right is drawn in the lower right corner of the frame image. On the other hand, when the left turn signal is in the on state, the blinker icon Pin flowing to the left is drawn in the lower left corner of the frame image.

In S108, it is determined whether or not the remaining distance Dr grasped in S101 is between the superposition threshold value THs and the end threshold value THe. When the remaining distance Dr is equal to or greater than the superposition threshold THs, or when the remaining distance Dr is less than the end threshold THs, the process proceeds from S108 to S110. On the other hand, when the remaining distance Dr is less than the superposition threshold THs and equal to or more than the end threshold THe, the process proceeds from S108 to S109. In S109, the guide lane marking line Pg1 is set to be drawn, and the process proceeds to S110.

In S110, it is determined whether or not the exit condition of the intersection is satisfied. For example, in S110, it is determined that the exit condition is satisfied when the operating state of the blinker changes from the on state to the off state, or when the position of the own vehicle deviates from the intersection node. When the exit condition of the intersection is not satisfied, the process proceeds from S110 to S112. On the other hand, when the exit condition of the intersection is satisfied, the process proceeds from S110 to 111. In S111, the traveling direction guide Pid2 is set to be drawn, and the process proceeds to S112.

In S112, the drawing data selected in S102 to S111 is output to the HUD 20, and the process proceeds to S113. In S113, it is determined whether or not the guidance area this time has ended. For example, in S113, it is determined that the guidance area has ended when the repetition of the traveling direction guide Pid2 is completed a predetermined number of times, when the vehicle travels away from the reference position GP by a predetermined distance, or when the next route information is acquired, and the display process ends. On the other hand, when it is determined that the guidance area has not ended, the process returns to S101 and the display process for route guidance is continued.

Figure 14:
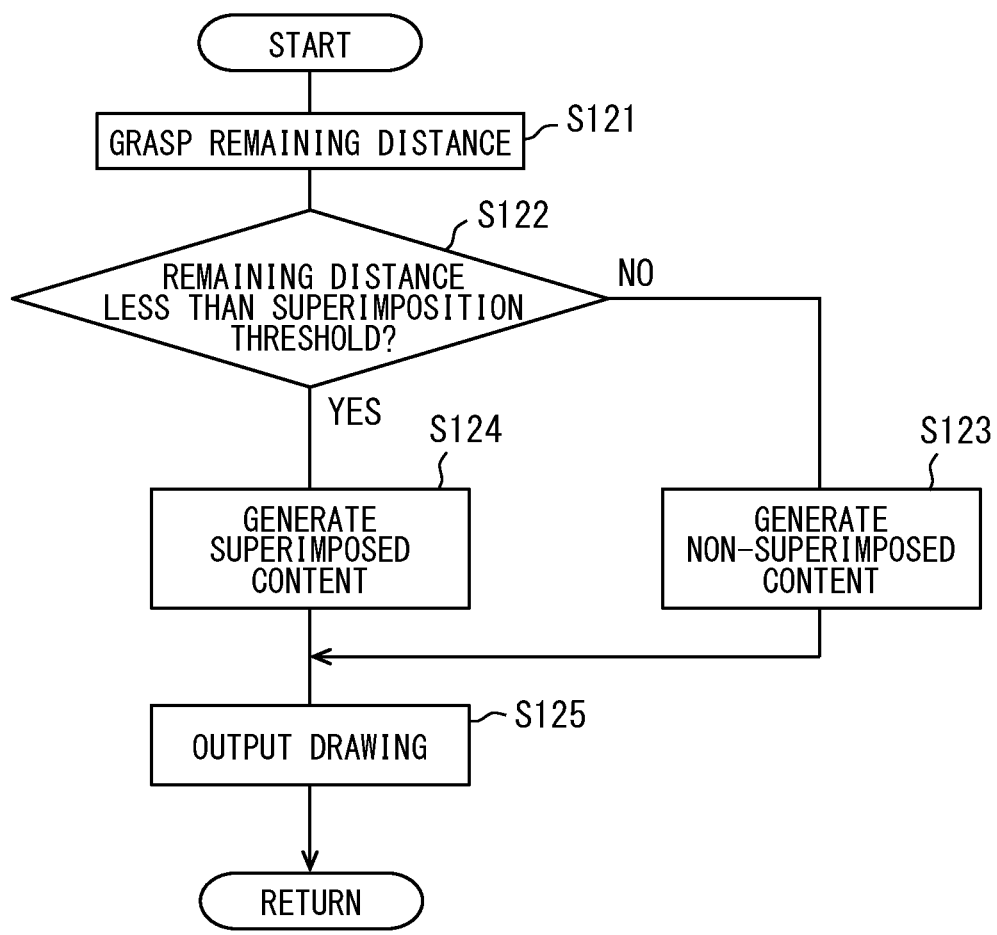
FIG. 14 is a flowchart showing details of display processing for road sign assist.

The display process shown in FIG. 14 is started by the HCU 100 based on the acquisition of the road sign detection information by the external information acquisition unit 74, and is repeated until the own vehicle leaves the effective section of the road sign. In S121 of the display process for such road sign assist, the remaining distance Dr to the reference position GP set at the installation position of the road sign is grasped, and the process proceeds to S122. In S122, it is determined whether or not the remaining distance Dr to the road sign is less than the superposition threshold THs. When it is determined in S122 that the remaining distance Dr to the road sign is equal to or greater than the superposition threshold THs, the process proceeds to S123. In S123, a frame image including the non-superimposed content CTn (see FIG. 12A) is generated, and the process proceeds to S125.

On the other hand, when it is determined in S122 that the remaining distance Dr is less than the superposition threshold THs, the process proceeds to S124. In S124, a frame image including the superimposed content CTs (see FIG. 12B) is generated, and the process proceeds to S125. In S124 immediately after the result of the remaining distance determination in S122 is switched, a frame image is generated so that the transition animation Ats is displayed. In S125, a process of outputting the drawing data generated in either S123 or S124 toward HUD20 is performed, and the process returns to S121.

In the first embodiment described above, the superimposed display by the HUD 20 is changed from the non-superimposed content CTn having substantially the same meaning to the superimposed content CTs. Therefore, even if the information presentation using the HUD 20 having a limited angle of view VA is started at an early stage, the misunderstanding of the driver who is the user is unlikely to occur. Therefore, it is possible to present highly convenient information.

To explain in detail, since the angle of view VA of the HUD 20 is limited, if the information presentation by the superimposed content CTs is started after the superimposed target Tr enters the angle of view VA, the notification to the driver will be delayed. For example, if information is presented only by the superimposed content CTs, the timing of displaying the superimposed content CTs on the road surface in a scene for guiding a right or left turn at an intersection will be the closest to the intersection.

However, as described above, when the information is presented by using the non-superimposed content CTn in addition to the superposed content CTs, the information presentation such as right/left turn guidance at the intersection will be started at the timing that the driver has time to spare without waiting the superimposed target Tr to enter the angle of view VA, for example. Therefore, the convenience of presenting information can be ensured even if the angle of view of the HUD 20 is limited.

In addition, in the first embodiment, after the display of the guide lane marking line Pg1 which is the superimposed content CTs is started, the display of the route icon Prg which is the non-superimposed content CTn is finished. Similarly, after the display of the traveling direction guide Pid1 which is the non-superimposed content CTn is started, the display of the guide lane marking line Pg1 is finished. In the above display transition, a period is provided in which the superimposed content CTs and the non-superimposed content CTn are simultaneously displayed in the angle of view VA. Therefore, the transition from the non-superimposed content CTn to the superimposed content CTs and the transition from the superimposed content CTs to the non-superimposed content CTn become easy for the driver to understand.

Further, in the first embodiment, in the information presentation of the load sign assist, the display of the superimposed content CTs is started when the display of the non-superimposed content CTn is terminated by the display of the transition animation Ats. As described above, the amount of information displayed in the angle of view VA can be minimized by eliminating the period during which the contents having the same meaning are simultaneously displayed. Further, since the non-superimposed content CTn and the superposed content CTs are not mixed, simple and easy-to-understand information presentation can be performed.

Further, in the first embodiment, the transition animation Ats that transitions the display state from the non-superimposed content CTn to the superposed content CTs is displayed. Such transition animation Ats can clearly indicate to the driver the relationship between the non-superimposed content CTn and the superposed content CTs having the same meaning. Therefore, even if the non-superimposed content CTn and the superposed content CTs are used in combination, the driver's discomfort can be reduced.

In addition, in the transition animation Ats of the first embodiment, the non-superimposed content CTn moving toward the superimposition target Tr changes to the superimposition content CTs. By moving the display object in this way, the driver's line of sight can be guided to the superimposed target Tr in accordance with the change in the display mode on the superimposed content CTs. Therefore, the driver's discomfort with respect to information presentation using both the non-superimposed content CTn and the superposed content CTs can be further reduced.

Further, in the first embodiment, the traffic sign image Pts in the form imitating the road sign is displayed as the non-superimposed content CTn. In this way, when the display form of the non-superimposed content CTn is similar to that of a generally known road sign, the driver can understand the meaning of the non-superimposed content CTn smoothly even if the non-superimposed content CTn is started to be displayed without being superimposed on the superimposed target Tr.

Further, in the first embodiment, after displaying the guide lane marking line Pg1, the traveling direction guide Pid1 is displayed as the non-superimposed content CTn having a display form different from that of the route icon Prg. According to the display of the traveling direction guide Pid1, the left turn guidance to the driver can be continued even after approaching the superposition target Tr. In addition, when the display form of the non-superimposed content CTn is changed according to the remaining distance Dr to the intersection, it is possible to guide the left turn position at each position in an easy-to-understand manner.

In addition, in the first embodiment, the route icon Prg to be displayed as the non-superimposed content CTn notifies the driver in advance of the traveling direction set in each lane before the intersection before reaching the intersection. Therefore, the driver can understand in advance the direction in which the vehicle can travel in each lane and can change the travelling lane to an appropriate lane.

In the first embodiment, the route icon Prg corresponds to the "pre-non-superimposed content", and the traveling direction guide Pid1 corresponds to the "post-non-superimposed content". Further, the remaining distance Dr corresponds to the "distance (to a specific position)", and the superimposition threshold THs corresponds to the "threshold". Further, the external information acquisition unit 74 corresponds to the "forward information acquisition unit", the virtual layout unit 75 corresponds to the "target position grasping unit", and the HCU 100 corresponds to the "display control device".

Second Embodiment

Figure 15:
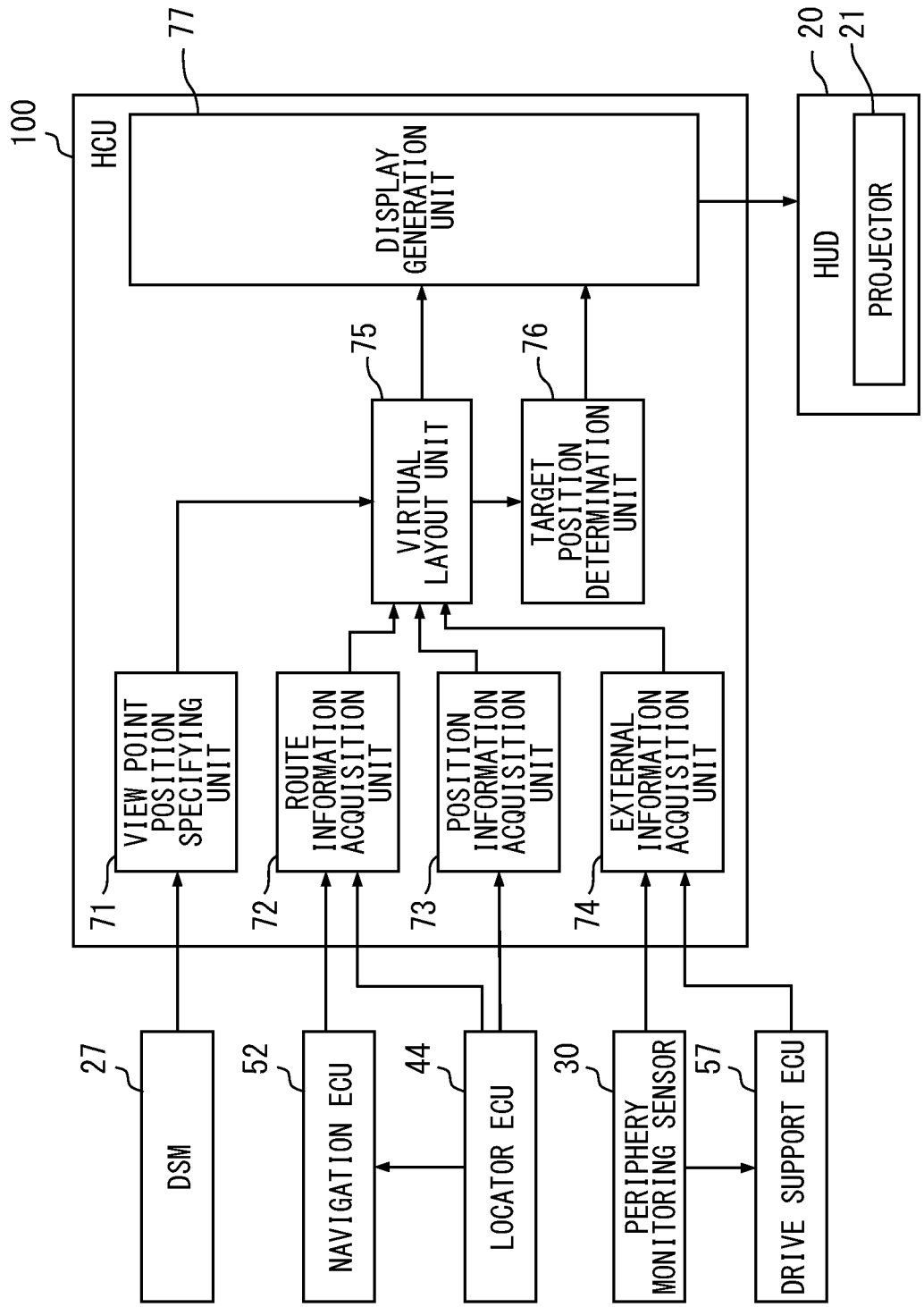
FIG. 15 is a diagram showing an example of a schematic configuration of the HCU of the second embodiment.
Figure 16:
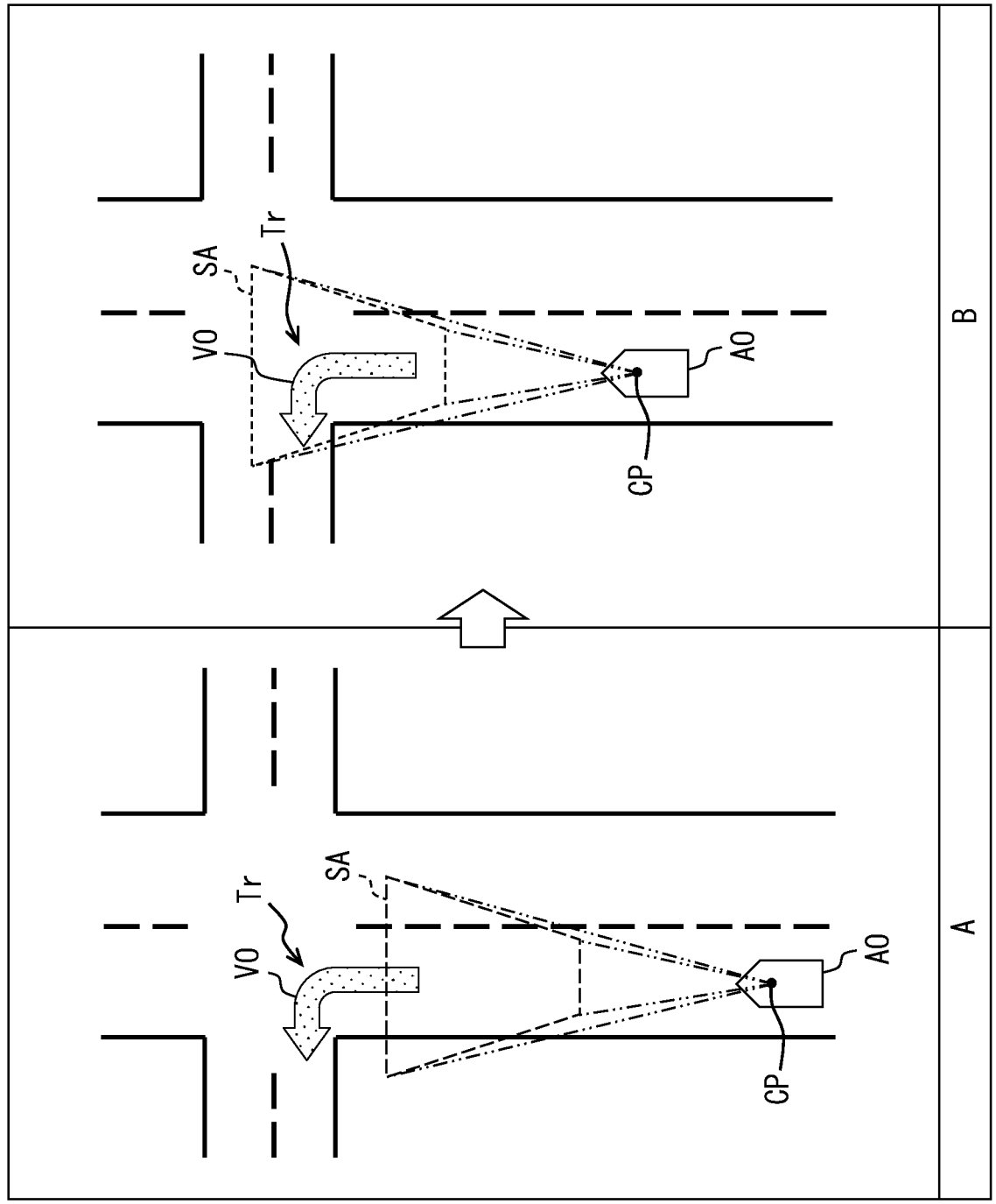
FIG. 16 is a diagram showing an example of a display layout simulation performed by the virtual layout unit to be visualized.
Figure 17:
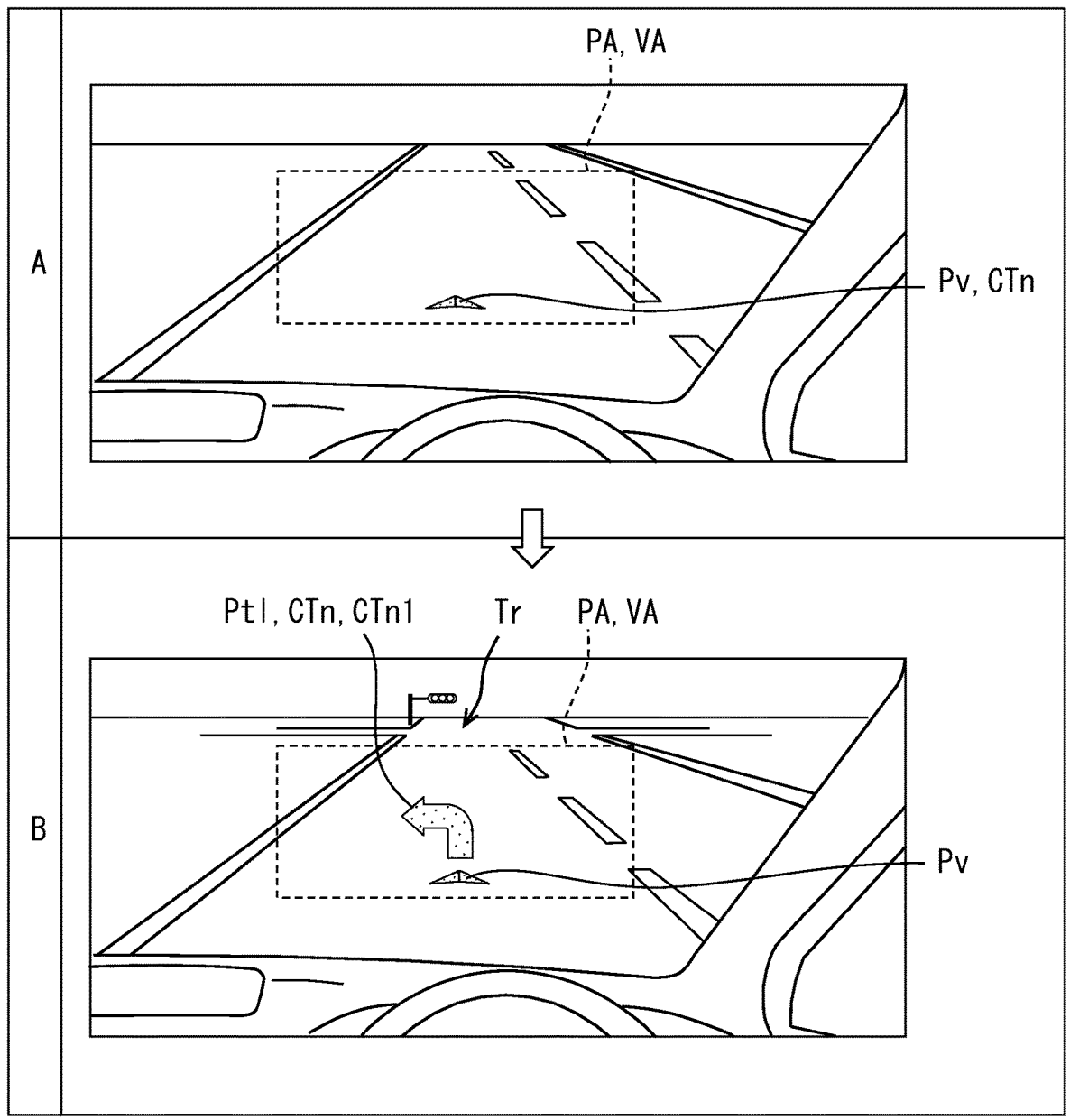
FIG. 17 is a diagram showing a series of display transitions for providing left turn guidance at an intersection together with FIG. 18 or 19.
Figure 18:
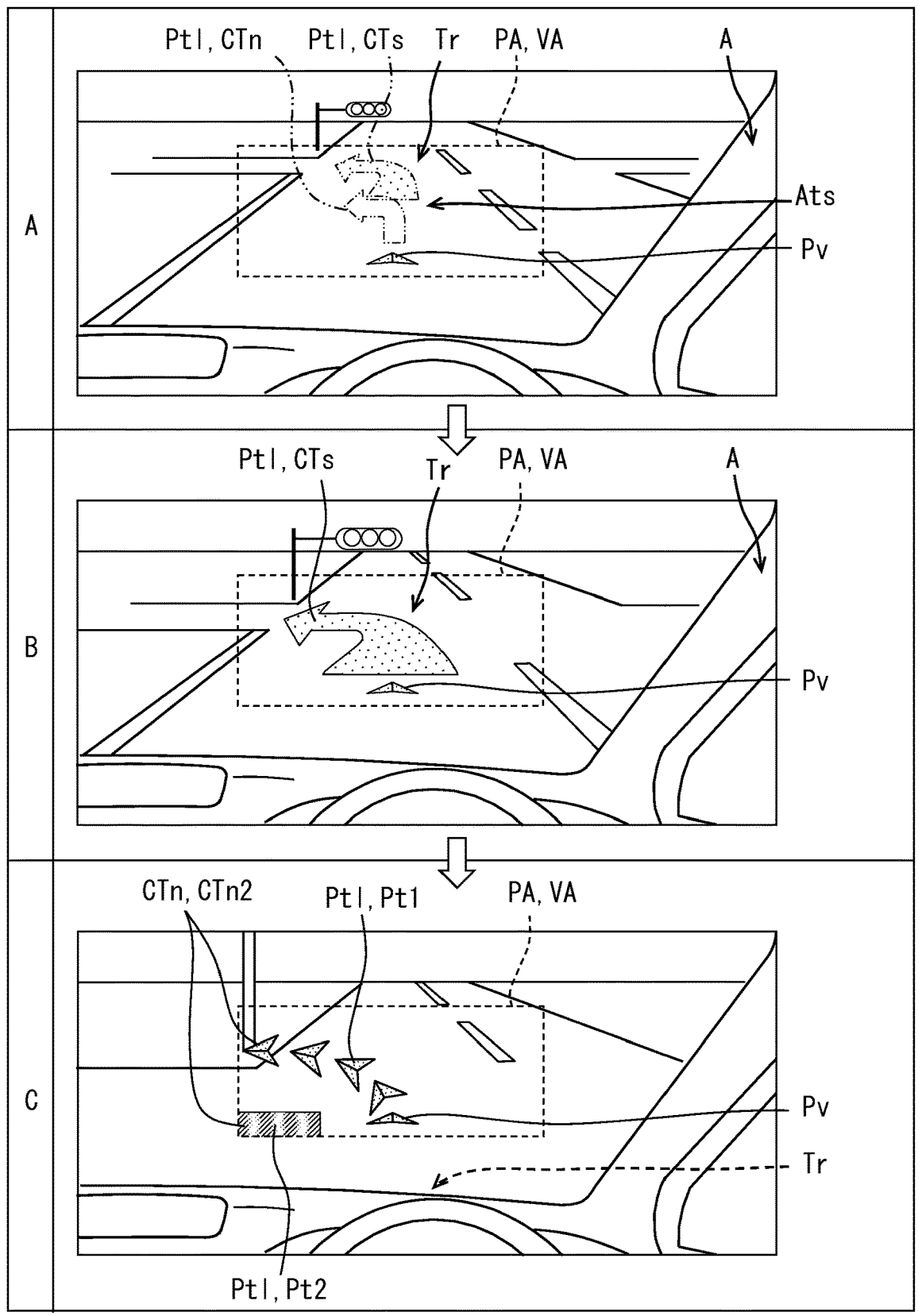
FIG. 18 is a diagram showing a transition of display when there is no vehicle in front that overlaps with a virtual image, together with FIG. 17.

A second embodiment of the present disclosure shown in FIG. 15 to FIG. 21 is a variation example of the first embodiment. In the second embodiment, the arrow-shaped left turn image Pt1 as shown in FIG. 18 is displayed as the superimposed content CTs. In addition, the HCU 100 of the second embodiment shown in FIG. 15 is further provided with a target position determination unit 76 in addition to the same functional units as those of the first embodiment. Hereinafter, the details of the target position determination unit 76 and the display generation unit 77 of the second embodiment will be described in order.

The target position determination unit 76 determines whether or not a superimposition target Tr is disposed in the angle of view VA of the HUD 20. When viewed from the eye point EP (see FIG. 2), the front range overlapping the image plane IS is within the angle of view VA. Therefore, when the superimposition target Tr is visible through the image plane IS, the target position determination unit 76 determines that the superimposition target Tr is within the angle of view VA. On the other hand, when the superimposition target Tr visually recognized through the windshield WS (see FIG. 2) is out of the image plane IS, the target position determination unit 76 determines that the superimposition target Tr is outside the angle of view VA.

The target position determination unit 76 determines whether or not the superimposition target Tr is within the angle of view VA based on the layout information provided by the virtual layout unit 75. Specifically, the target position determination unit 76 determines that the superimposition target Tr is within the angle of view VA when substantially the entire virtual object VO is located within the superimposition range SA viewed from the virtual camera position CP (see FIG. 16B). When at least a part of the virtual object VO protrudes from the superimposition range SA seen from the virtual camera position CP (see FIG. 16A), the target position determination unit 76 determines that the superimposition target Tr is outside the angle of view VA. The target position determination unit 76 provides the display generation unit 77 with the result of the determination within the angle of view based on the positional relationship between the superposition range SA and the virtual object VO.

The details of the angle of view determination by the target position determination unit 76 may be changed as appropriate. For example, the target position determination unit 76 may perform the determination within the angle of view of the superposition target Tr based on whether or not the main part of the virtual object VO is included in the superposition range SA. The main part of the virtual object VO is an important part for understanding the meaning of the content in the superimposed display state. For example, in the case of an arrow-shaped virtual object VO used for route guidance, the triangular tip portion is the main part.

The display generation unit 77 determines the original image to be drawn in each frame image for providing the image data based on the result of the determination within the angle of view acquired from the target position determination unit 76 in addition to the selection result of the content acquired from the virtual layout unit 75. The display generation unit 77 switches between information presentation using non-superimposed content CTn and information presentation using superimposition content CTs based on the result of the view angle determination.

Specifically, when the superimposition target Tr is outside the angle of view VA, the display generation unit 77 draws the original image of the non-superimposition content CTn on each frame image. On the other hand, when the superimposition target Tr is within the angle of view VA, the display generation unit 77 draws the original image of the superimposition content CTs on each frame image using the layout information provided by the virtual layout unit 75.

For example, in the left turn guidance scene, the display generation unit 77 displays an arrow-shaped left turn image Pt1 pointing to the left in a virtual image in the angle of view VA in one of the display modes of the superimposed content CTs or the non-superimposed content CTn (see FIGS. 17 and 18). In addition, the display generation unit 77 displays the superimposed content CTs in an avoidance form that avoids the front vehicle Af when the front vehicle Af is detected (see FIG. 19). With such display control, it is possible to avoid a situation in which the superimposed content CTs hinders the visibility of the vehicle Af in front and rather deteriorates the convenience of presenting information.

The details of the display transition of the route guidance of the second embodiment as described above will be described with reference to FIGS. 1 and 15 based on FIGS. 17 to 19.

The display generation unit 77 displays the own vehicle marker Pv as a virtual image near the center of the angle of view VA before the notification of the guidance implementation request by the navigation device 50 (see FIG. 17A). The own vehicle marker Pv is the non-superimposed content CTn that makes the image of the own vehicle image as in the first embodiment, and is always displayed at a predetermined position defined in advance.

The navigation ECU 52 outputs a guidance implementation request to the HCU 100, for example, when the remaining distance from the vehicle A to the intersection is less than a predetermined distance (for example, about 700 m). The HCU 100 starts presenting information based on the acquisition of the guidance implementation request from the navigation device 50.

At this time, the intersection serving as the superimposition target Tr is visually recognized above the angle of view VA when viewed from the driver. Therefore, the display generation unit 77 displays the non-superimposed content CTn at the stage where the superimposition target Tr is outside the angle of view VA prior to the display of the superimposition content CTs (see FIG. 18B). The non-superimposed content CTn is a left turn image Pt1 having substantially the same meaning as the superposed content CTs (see FIG. 17B). The left turn image Pt1 is displayed above the own vehicle marker Pv and is displayed at a substantially central position of the angle of view VA (i.e., the projection range PA). The left turn image Pt1 is displayed in a raised posture with respect to the road surface so as to face the driver.

When the superimposition target Tr enters the angle of view VA, the display generation unit 77 starts displaying the transition animation Ats based on the determination within the angle of view by the target position determination unit 76 (see FIG. 17A). The transition animation Ats is a moving image in which the display state of the left turn image Pt1 is changed from the non-superimposed content CTn to the superposed content CTs. In the transition animation Ats, the arrow-shaped image moves from the center of the angle of view VA toward the superposition target Tr. The display generation unit 77 moves the left turn image Pt1 above the angle of view VA while tilting the posture of the left turn image Pt1 displayed as the non-superimposed content CTn in the depth direction seen from the driver, that is, the traveling direction of the vehicle A. As a result, the left turn image Pt1 as the superimposed content CTs is superimposed and displayed at the intersection which is the superimposed target Tr (see FIG. 18B).

The display generation unit 77 advances the start timing of the transition animation Ats with respect to the approach timing so that the completion timing of the transition animation Ats and the approach timing of the superimposed target Tr into the angle of view VA coincide with each other. In addition, the display generation unit 77 increases the moving speed of the display object (i.e., the left turn image Pt1) in the transition animation Ats as the traveling speed of the vehicle A increases.

The left turn image Pt1 as the superimposed content CTs is the content extending in the depth direction along the road when viewed from the driver's eye point EP (see FIG. 2). The left turn image Pt1 is displayed in such a manner that it sticks to the road surface at an intersection. The left turn image Pt1 maintains a display state in which the vehicle A is relatively fixed at a predetermined position where the superposition target Tr exists even when the vehicle A moves toward the intersection. Therefore, the left turn image Pt1 gradually increases as the driver approaches the intersection, similar to the actual view seen by the driver.

As described above, when the vehicle A further approaches the intersection after displaying the left turn image Pt1 as the superimposed content CTs, the superimposed target Tr moves out of the angle of view VA. That is, the superimposition target Tr becomes visible on the lower side of the angle of view VA. The display generation unit 77 ends the display of the left turn image Pt1 as the superimposed content CTs based on the determination by the target position determination unit 76 that the superimposed target Tr has come out of the angle of view VA, and displays the left turn image Pt1 as the non-superimposed content CTn again (see FIG. 18C). The non-superimposed content CTn redisplayed as the left turn image Pt1 is an image substantially the same as the traveling direction guide Pid1 (see FIG. 8B) of the first embodiment.

For convenience, the non-superimposed content CTn displayed before the superimposition target Tr enters the angle of view VA is defined as "a pre-non-superimposition content CTn1", and the non-superimposition content CTn displayed after the superimposition target Tr goes out of the angle of view VA is defined as "a post-non-superimposed content CTn2". The post-non-superimposed content CTn2 is displayed in a display form different from that of the pre-non-superimposed content CTn1. However, the pre-non-superimposed content CTn1 and the post-non-superimposed content CTn2 both have substantially the same meaning as the superposed content CTs, and are contents that guide a left turn, respectively.

The display generation unit 77 displays two types of left turn images Pt1 as post-non-superimposed contents CTn2. The first left turn image Pt1 (hereinafter referred to as "first left turn image Pt1") is displayed by a triangular image portion similar to the own vehicle marker Pv. The first left turn image Pt1 is displayed as an animation in which the image repeatedly flies from above the vehicle marker Pv toward the left edge of the angle of view VA. The second left turn image Pt1 (hereinafter referred to as "second left turn image Pt2") is substantially the same as the blinker icon Pin (see FIG. 8B) of the first embodiment, and has a horizontally long thick band shape in the lower left corner of the angle of view VA. The second left turn image Pt2 is displayed as an animation as if it is continuously moving toward the left. The display generation unit 77 ends each display of the first left turn image Pt1 and the second left turn image Pt2 at the timing of passing through the intersection. When the vehicle A passes through the intersection, the display generation unit 77 displays the traveling direction guide Pid2 (FIG. 8C) which is substantially the same as that of the first embodiment.

Figure 19:
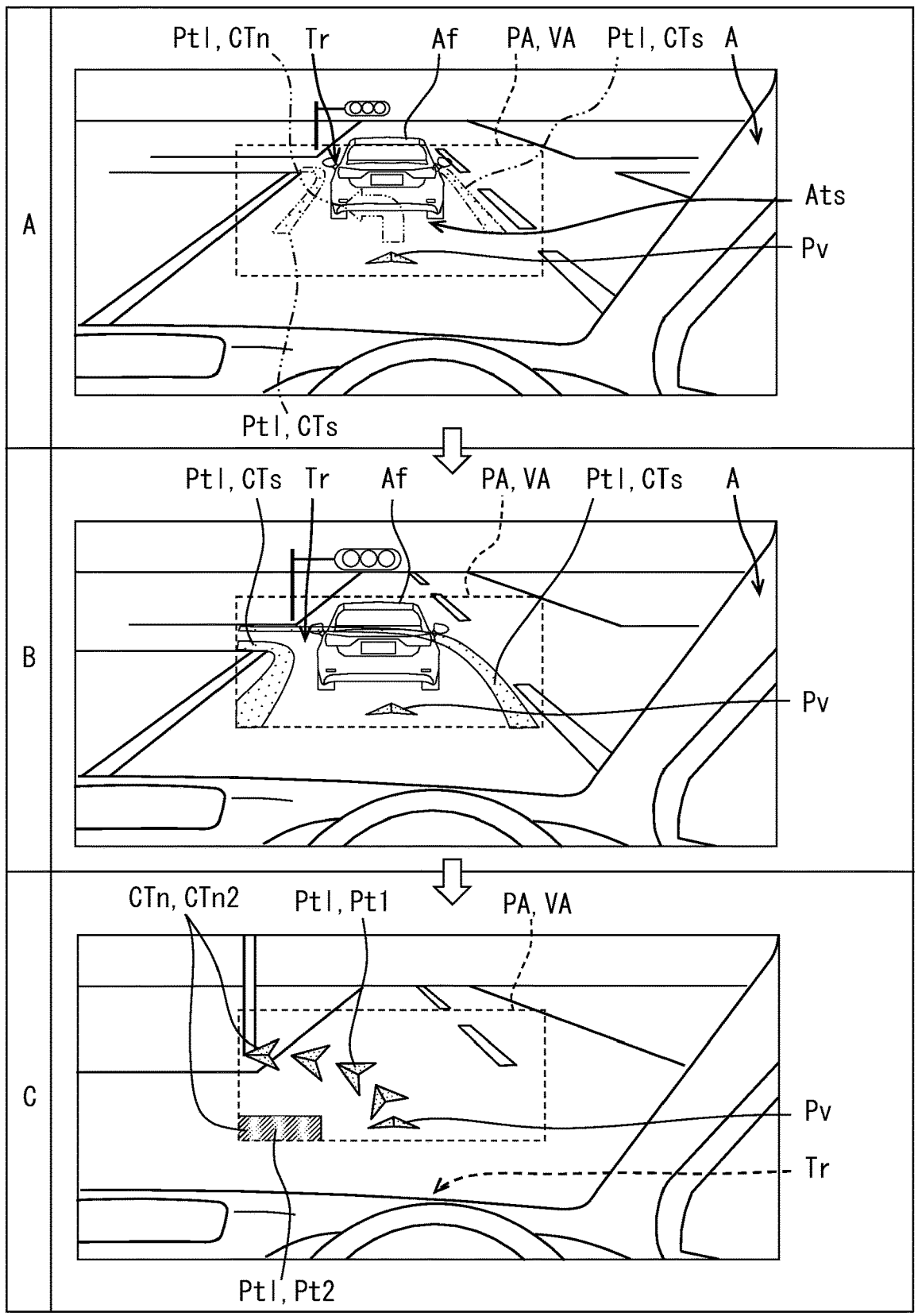
FIG. 19 is a diagram showing a display transition in the presence of a vehicle in front that overlaps with a virtual image, together with FIG. 17.

When the detection information of the front vehicle Af is acquired by the external information acquisition unit 74, the display generation unit 77 changes the display shape of the superimposed content CTs to an avoidance shape that avoids the front vehicle Af, as shown in FIG. 19. Specifically, the display generation unit 77 superimposes and displays the arrow-shaped left turn image Pt1 as described above on the road surface of the intersection as the superimposed content CTs when there is no vehicle Af in front (see FIG. 18B). On the other hand, when the preceding vehicle Af is present, the display generation unit 77 superimposes and displays a pair of strip-shaped left turn images Pt1 on the road surfaces on both the left and right sides of the preceding vehicle Af (see FIG. 19A). This left turn image Pt1 is substantially the same as the guide lane marking line Pg1 (see FIG. 7C) of the first embodiment. The area where the strip-shaped left turn image Pt1 overlaps with the preceding vehicle Af is smaller than the area where the arrow-shaped left turn image Pt1 overlaps with the preceding vehicle Af.

When the superimposing target Tr enters the angle of view VA in the presence of the preceding vehicle Af, the display generation unit 77 starts displaying the transition animation Ats having different contents from the case where the preceding vehicle Af does not exist. In the transition animation Ats in this case, the left turn image Pt1 displayed as the non-superimposed content CTn is split into left and right sides. Each of the divided left and right image elements is deformed into a band shape extending along the road surface while falling in the traveling direction of the vehicle A, and moves to the vicinity of the left and right lane markings of the own vehicle lane. As a result, each left turn image Pt1 as the superimposed content CTs is superimposed and displayed on the road surfaces on both the left and right sides of the vehicle Af in front (see FIG. 19). Each left turn image Pt1 has a shape in which the tip portion corresponding to the front side in the traveling direction is curved to the left, and is superimposed and displayed on the road surface of the intersection serving as the superimposition target Tr. The display generation unit 77 can display the post-non-superimposed content CTn2 which is substantially the same as when the preceding vehicle Af does not exist even when the preceding vehicle Af exists (see FIG. 19C).

Next, the details of the display processing performed by the HCU 100 in order to realize the information presentation described above will be described below with reference to FIG. 15 and the like based on the flowcharts shown in FIGS. 20 and 21, respectively.

Figure 20:
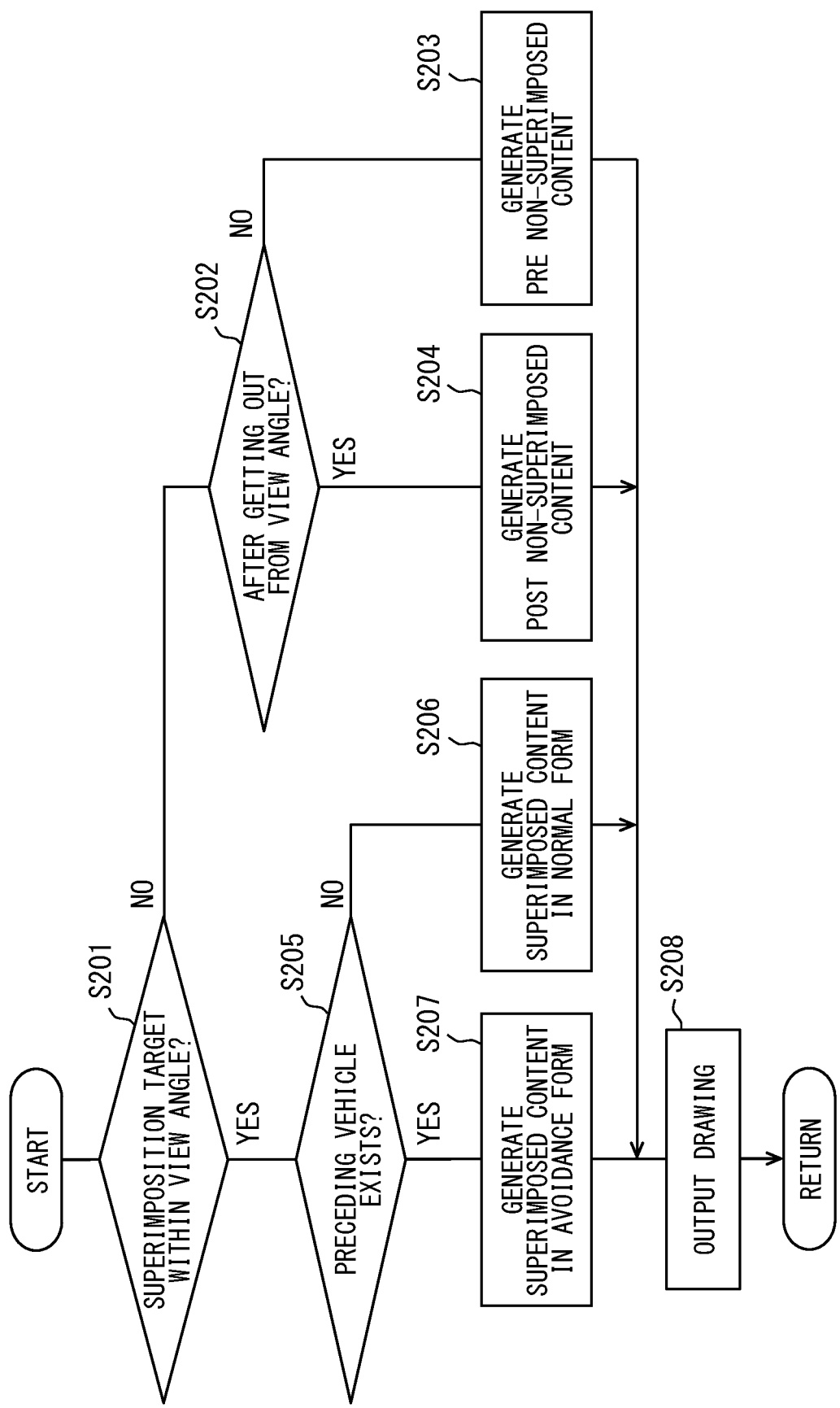
FIG. 20 is a flowchart showing details of display processing for route guidance.

The display process shown in FIG. 20 is started by the HCU 100 based on the acquisition of the guidance execution request by the route information acquisition unit 72, and is repeated until the vehicle passes through the guide area including the intersection or the like. In S201 in such a display process for route guidance, it is determined whether or not the superimposition target Tr is within the angle of view VA based on the positional relationship between the virtual object VO and the superimposition range SA in the virtual space (see FIG. 16). When it is determined in S201 that the superimposition target Tr is within the angle of view VA, the process proceeds to S205. On the other hand, when it is determined in S201 that the superimposition target Tr is outside the angle of view VA, the process proceeds to S202.

In S202, it is determined whether or not the superimposition target Tr has once entered the angle of view VA and further exited the angle of view VA. When it is determined in S202 that the superimposition target Tr has not yet entered the angle of view VA, the process proceeds to S203. In S203, a frame image including the pre-non-superimposed content CTn1 (see FIG. 17B) is generated, and the process proceeds to S208. On the other hand, when it is determined in S202 that the superimposition target Tr has come out of the angle of view VA, the process proceeds to S204. In S204, a frame image including the post-non-superimposed content CTn2 (see FIGS. 18C and 19C) is generated, and the process proceeds to S208.

On the other hand, in S205 when it is determined in S201 that the superimposition target Tr is within the angle of view VA, the presence or absence of the vehicle in front Af is determined. When it is determined in S205 that there is no vehicle Af in front, the process proceeds to S206. In S206, a frame image including the superimposed content CTs in the normal form (see FIG. 18B) is generated, and the process proceeds to S208.

On the other hand, when it is determined in S205 that there is a vehicle in front Af, the process proceeds to S207. In S207, a frame image including superimposed content CTs (see FIG. 19B) in a form of avoiding the vehicle Af in front is generated, and the process proceeds to S208. In S206 or S207 immediately after the result of the angle of view determination in S201 is switched, a frame image is generated so that the transition animation Ats (see FIGS. 18A and 19A) is displayed. Then, in S208, a process of outputting the drawing data generated in any of S203, S204, S206, and S207 to HUD20 is performed, and the process returns to S201.

Figure 21:
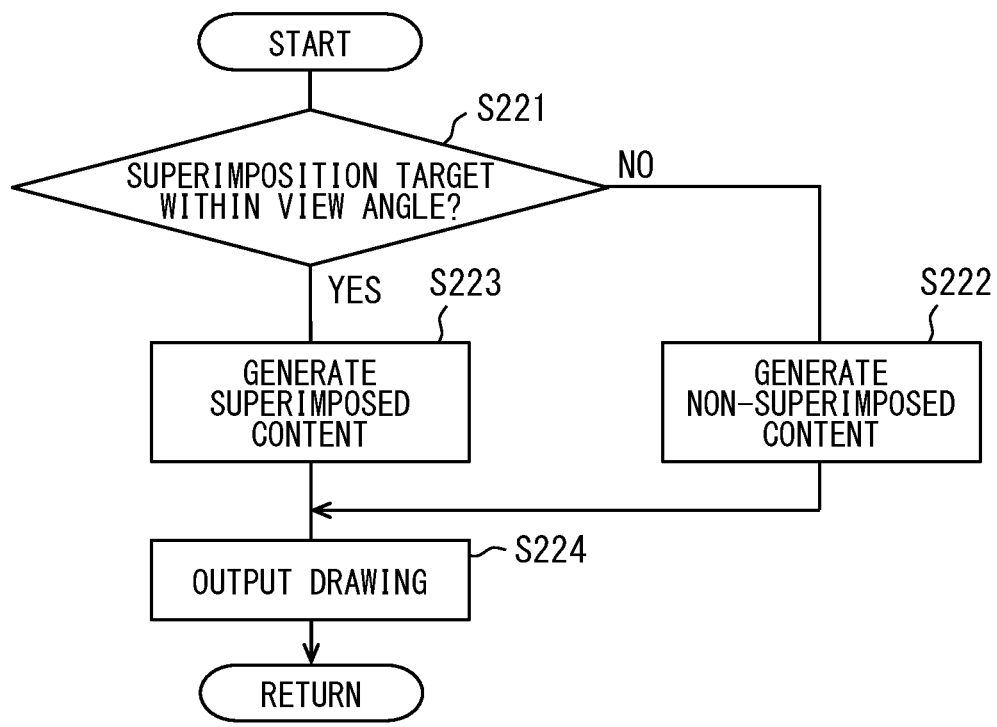
FIG. 21 is a flowchart showing details of display processing for road sign assist.

The display process shown in FIG. 21 is a process of transitioning the traffic sign image Pts (see FIG. 12) from the non-superimposed content CTn to the superimposed content CTs based on the determination within the angle of view by the target position determination unit 76. The display process shown in FIG. 21 is started by the HCU 100 based on the acquisition of the road sign detection information by the external information acquisition unit 74, and is repeated until the own vehicle leaves the effective section of the road sign.

In S221, it is determined whether or not the road sign is within the angle of view VA. When it is determined in S221 that the road sign is outside the angle of view VA, the process proceeds to S222. In S222, a frame image including the non-superimposed content CTn (see FIG. 12A) is generated, and the process proceeds to S224. On the other hand, when it is determined in S221 that the road sign is within the angle of view VA, the process proceeds to S223. In S223, a frame image including the superimposed content CTs (see FIG. 12B) is generated, and the process proceeds to S224. In S221 immediately after the result of the view angle determination in S223 is switched, a frame image is generated so that the transition animation Ats is displayed. In S224, a process of outputting the drawing data generated in either S222 or S223 toward HUD20 is performed, and the process returns to S221.

The second embodiment described above has the same effect as that of the first embodiment, and even if the superimposed display is changed from the non-superimposed content CTn to the superimposed content CTs, these have substantially the same meaning. Therefore, misunderstanding of the driver is less likely to occur. Therefore, it is possible to present highly convenient information.

In addition, in the transition animation Ats of the second embodiment, the left turn image Pt1 or the traffic sign image Pts moves from the center of the angle of view VA toward the superimposition target Tr. By moving the display object in this way, the driver's line of sight can be guided to the superimposed target Tr in accordance with the change in the display mode on the superimposed content CTs.

Further, in the second embodiment, when the preceding vehicle Af is detected, the superimposed content CTs of the avoidance mode that avoids the front vehicle Af is displayed. Therefore, it is possible to avoid a situation in which the superimposed content CTs hinders the visibility of the vehicle Af in front and rather deteriorates the convenience of presenting information.

Third Embodiment

Figure 22:
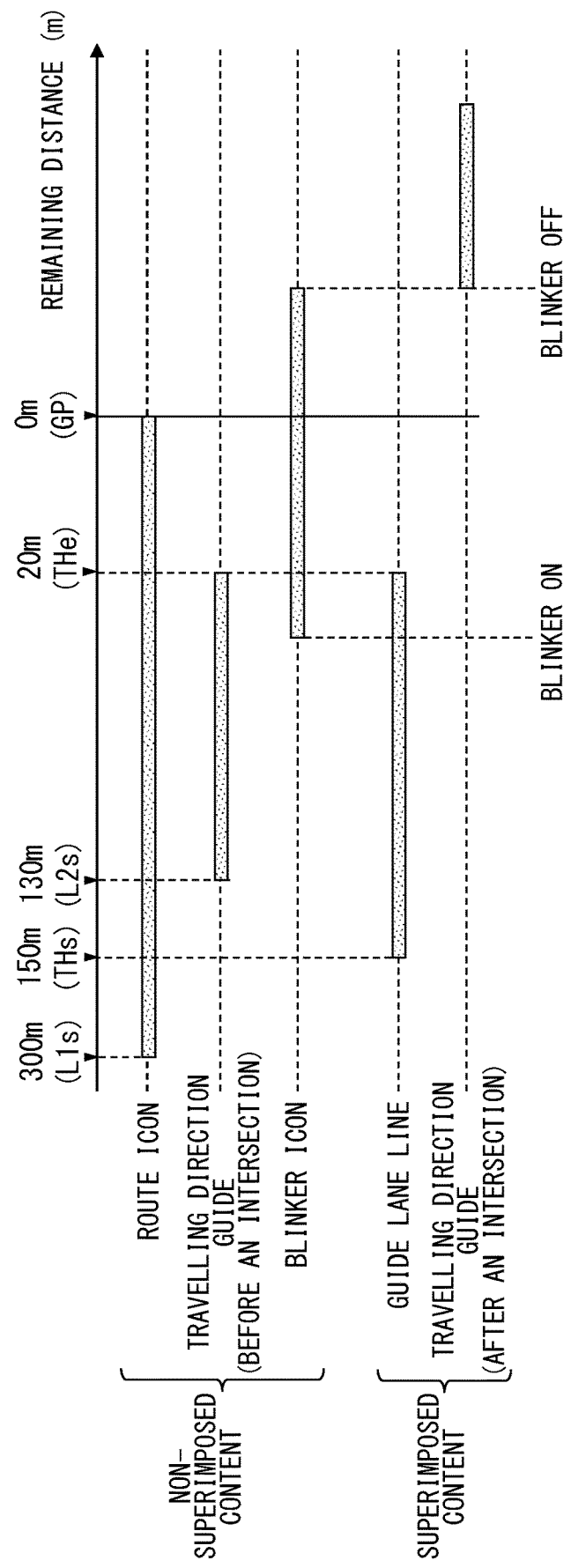
FIG. 22 is a timing chart showing details of transition between non-superimposed content and superposed content in the third embodiment.
Figure 23:
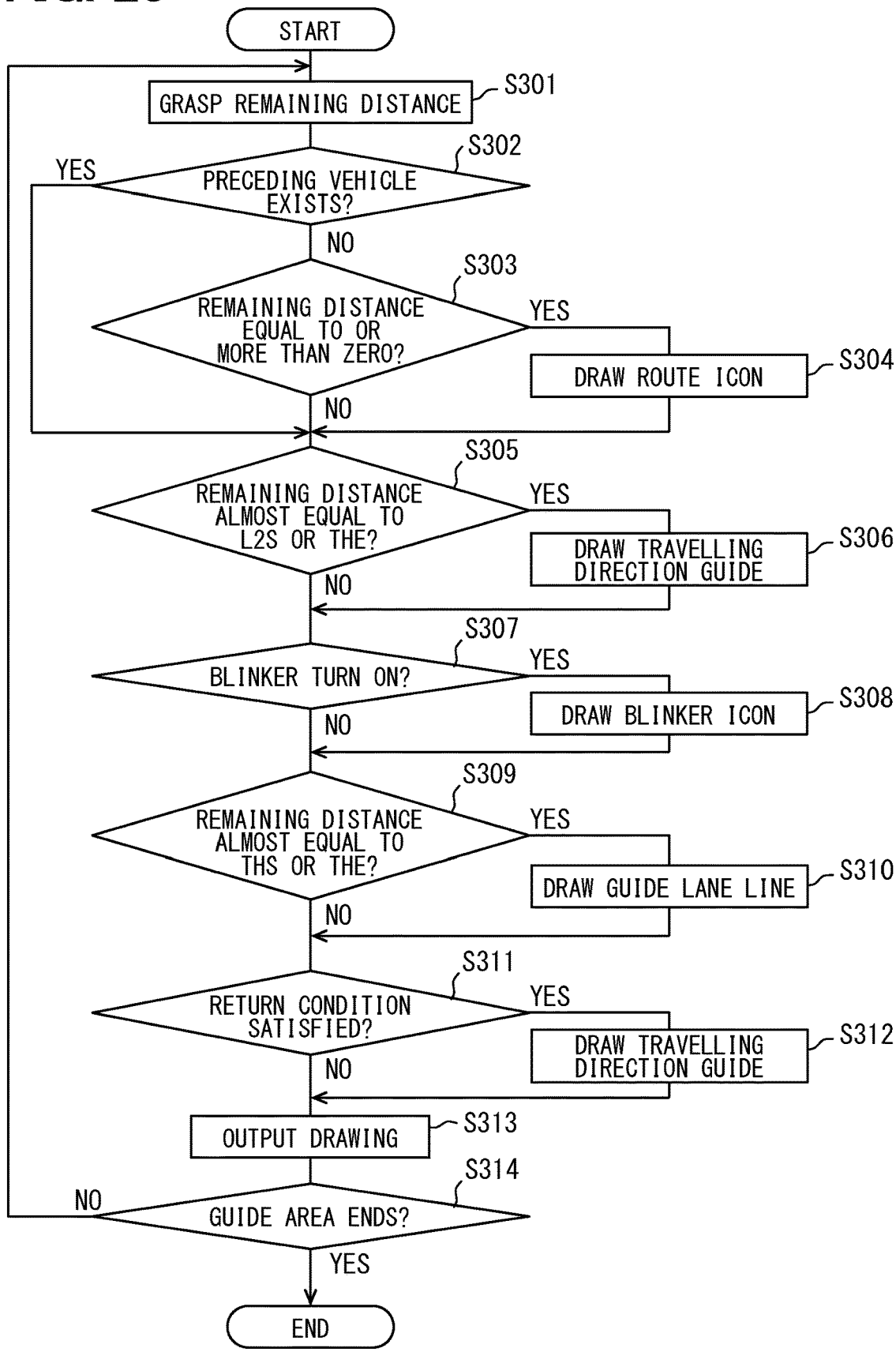
FIG. 23 is a flowchart showing details of display processing for route guidance.

The third embodiment of the present disclosure is a different example of the first embodiment. In the third embodiment, as shown in FIGS. 22 and 23, the display start point and display end point of the route icon Prg, the traveling direction guide Pid1 and the guide lane marking line Pg1 displayed as the event display object DiE are different from the first embodiment. Hereinafter, the details of the information presentation of the third embodiment will be described with reference to FIGS. 3 and 4 based on FIGS. 22 and 23. In the display process of the third embodiment shown in FIG. 23, S301, S304, S306 to S314 are substantially the same as S101, S103, S105 to S113 (see FIG. 13) of the first embodiment.

The display of the route icon Prg starts at a position where the guidance implementation request is acquired by the route information acquisition unit 72, and the remaining distance Dr to the reference position GP is equal to the first start distance L1s, as in the first embodiment. The route icon Prg may be displayed near the right edge of the angle of view VA as in the first embodiment, or may be displayed in the center of the angle of view VA and then moved to the vicinity of the right edge or the like. The route icon Prg is continuously displayed until the vehicle A reaches the reference position GP at the intersection and the remaining distance Dr becomes zero (see S303 in FIG. 23).

The traveling direction guide Pid1 starts displaying at a position where the remaining distance Dr to the reference position GP is less than the second starting distance L2s. The second start distance L2s of the third embodiment is set longer than the second start distance L2s of the first embodiment (see FIG. 6), and is set to, for example, about 130 m. The second start distance L2s is set to a distance slightly shorter than the superimposition threshold THs. The traveling direction guide Pid1 continues to be displayed until the remaining distance Dr to the reference position GP becomes less than the end threshold value THe, similarly to the guide lane marking line Pg1 (see S305 in FIG. 23).

The guide marking line Pg1 is started to be displayed based on the condition that the remaining distance Dr to the reference position GP is less than the superposition threshold THs, and ends based on the condition that the remaining distance Dr to the reference position GP is less than the end threshold THs. The superimposition threshold value THe and the end threshold value THe are set based on the size of the angle of view VA of the HUD 20 and the type of the superimposition target Tr (see FIG. 7 and the like), and they are set to about 150 m and 20 m, respectively, when the road surface at the intersection is set as the superimposition target Tr. The display of the guide lane marking line Pg1 starts after the display of the route icon Prg. After the guide lane marking line Pg1 is displayed, the traveling direction guide Pid1 is further displayed.

As described above, the display generation unit 77 increases or decreases the number of event display objects DiE to be displayed at the same time in each of the approach section, the entrance section, and the exit section to the intersection. In other words, inside and outside the intersection, the display generation unit 77 changes the number of displays of the event display object DiE. The display generation unit 77 increases the number of event display objects DiE to be displayed on the front side of the specific position to be larger than the number of event display objects DiE to be displayed after the specific position.

Specifically, during the approach period when the remaining distance Dr is equal to or greater than the end threshold value THe, the display generation unit 77 simultaneously displays a large number of event display objects DiE to call attention to the approach of the intersection where the left turn should be made. Then, in the entrance period when the remaining distance Dr is less than the end threshold value THe, the display generation unit 77 limits the event display objects DiE to the route icon Prg and the blinker icon Pin, which are non-superimposed contents CTn. As described above, the display state in which the content display in the center of the angle of view VA is avoided and the front recognition of the driver is not hindered is formed. Further, in the exit section after the remaining distance Dr becomes zero, the display generation unit 77 reduces the event display objects DiE to be displayed to one, and sequentially displays the blinker icon Pin and the traveling direction guide Pid2. As a result, the virtual image display is in a state in which it is more difficult to obstruct the visibility of attention objects such as pedestrians located near the intersection.

The display generation unit 77 switches the presence and absence of the display of the route icon Prg based on whether or not the external information acquisition unit 74 has acquired the detection information of the vehicle in front Af (see FIG. 19) (see S302 in FIG. 23). Specifically, the display generation unit 77 displays the route icon Prg only when the preceding vehicle Af does not exist, and stops displaying the route icon Prg when the preceding vehicle Af exists. In other words, in the event display object DiE, the order in which the non-superimposed content CTn and the superposed content CTs are displayed is reversed depending on the presence or absence of the vehicle Af in front.

When the detection information of the vehicle in front Af is not acquired, the display generation unit 77 displays the route icon Prg prior to the display of the guide lane marking line Pg1. On the other hand, when the detection information of the vehicle in front Af is acquired, the display generation unit 77 cancels the initial display transition from the route icon Prg to the guide lane marking line Pg1. As a result, the display generation unit 77 first displays the guide lane marking line Pg1, which is the superimposed content CTs, as the event display object DiE, and then displays the traveling direction guide Pid1.

The third embodiment described above has the same effect as that of the first embodiment, and even if the superimposed display is changed from the non-superimposed content CTn to the superimposed content CTs, these have substantially the same meaning. Therefore, misunderstanding of the driver is less likely to occur. Therefore, it is possible to present highly convenient information.

In addition, in the third embodiment, when the vehicle in front Af is detected, the non-superimposed content CTn is displayed after displaying the superposed content CTs. As described above, according to the process of delaying the display start of the non-superimposed content CTn until after the display start of the superposed content CTs, it is possible to avoid overlapping the non-superimposed content CTn (i.e., the route icon Prg) that was preliminarily displayed at an early stage with the vehicle Af in front of the vehicle apparently by the driver. Therefore, it is possible to avoid a situation in which the non-superimposed content CTn hinders the visibility of the vehicle Af in front and rather deteriorates the convenience of presenting information.

Fourth Embodiment

Figure 24:
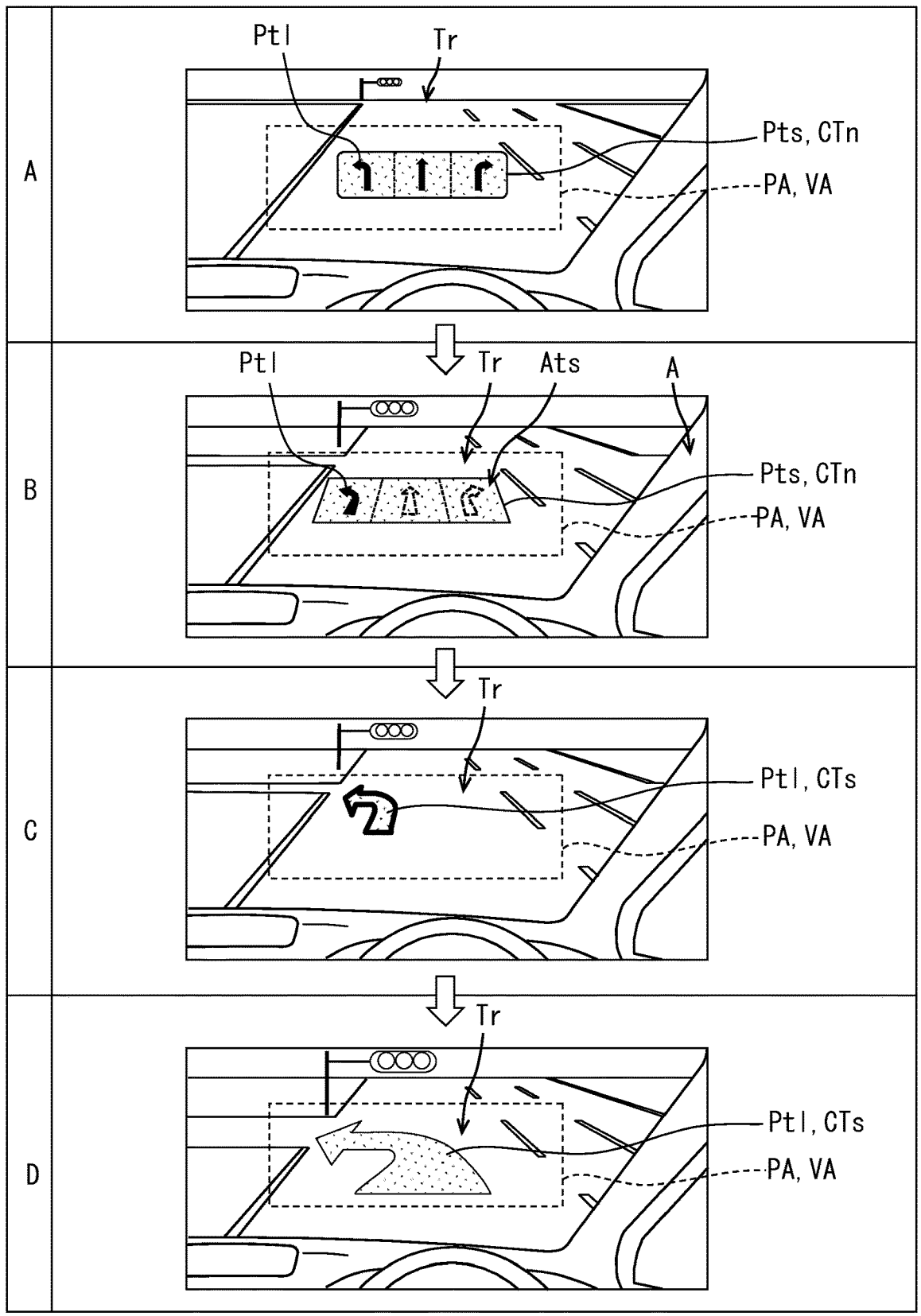
FIG. 24 is a diagram showing a transition of display in the information presentation of the fourth embodiment.

FIG. 24 illustrates a fourth embodiment of the present disclosure, which is an example of modification of the second embodiment. In the fourth embodiment, the display modes of the non-superimposed content CTn and the superimposed content CTs used for route guidance are different from those in the second embodiment. Hereinafter, the details of the display transition in the route guidance of the fourth embodiment will be described with reference to FIG. 15 based on FIG. 24. The information presentation shown in FIG. 24 provides route guidance based on route information at an intersection including a plurality of lanes.

The display generation unit 77 displays the left turn image Pt1 as the non-superimposed content CTn under the state where the superimposition target Tr (i.e., the intersection) is outside the angle of view VA based on the acquisition of the guidance execution request by the route information acquisition unit 72. The display generation unit 77 displays the traffic sign image Pts in a mode including the left turn image Pt1 (see FIG. 24A).

The traffic sign image Pts notifies the driver of the number of lanes and the traveling direction set for each lane as lane information for an intersection including a plurality of lanes. The traffic sign image Pts is displayed as non-superimposed content CTn. The traffic sign image Pts is displayed in a horizontally long square shape imitating a road sign, specifically, a "sign for traffic classification according to the direction of travel". The traffic sign image Pts is displayed at the center of the angle of view VA (i.e., the projection range PA).

The left turn image Pt1 is drawn in the shape of an arrow whose tip portion is bent to the left, and is displayed integrally with the portion of the traffic sign image Pts indicating the left turn lane. The left-turn image Pt1 in the shape of an arrow is highlighted so that it is more easily recognized by the driver than the other arrow-shaped images showing the straight-ahead lane and the right-turn lane, respectively.

The display generation unit 77 starts displaying the transition animation Ats when the superimposition target Tr enters the angle of view VA (see FIG. 24B). In the transition animation Ats, the upper side of the traffic sign image Pts displayed as the non-superimposed content CTn is gradually tilted toward the traveling direction of the vehicle A. In addition, in the transition animation Ats, the image portion of the traffic sign image Pts except for the left turn image Pt1 is gradually disappeared.

As a result of the display change by the transition animation Ats, only the left turn image Pt1 is left in a display posture as if it is adhered to the road surface of the intersection which is the superimposition target Tr (see FIG. 24C). The display location of the traffic sign image showing the lane information is moved to, for example, a multi-information display provided in a combination meter or the like, a center information display, or the like, and the display is continued.

The display generation unit 77 gradually enlarges the display size while moving the left turn image Pt1 to the center of the projection range PA so that the display is superimposed on a most part of the road surface of the own vehicle lane and the intersection (see FIG. 24D). As described above, the transition from the non-superimposed content CTn to the superposed content CTs is completed. The display of the left turn image Pt1 that has become the superimposed content CTs is continued until the superimposed target Tr deviates from the angle of view VA.

Here, when the vehicle A is traveling on a road where the intersections are continuously arranged, the display generation unit 77 sets and adjusts the timing of transitioning to the display state (see FIG. 24C) with remaining the left turn image Pt1 immediately before the intersection to be turned. In addition, the display generation unit 77 omits the display of the transition animation Ats when the interval between continuous intersections is short and it is difficult to secure the display time of the transition animation Ats. In this case, the display generation unit 77 immediately starts displaying the left turn image Pt1 as the superimposed content CTs (see FIG. 24D) after finishing the display of the traffic sign image Pts as the non-superimposed content CTn (see FIG. 24A).

Further, in the fourth embodiment, the superimposed contents CTs having a common shape are displayed regardless of the presence or absence of the vehicle Af in front. In addition, in the fourth embodiment, the display of the post-non-superimposed content CTn2 (see FIG. 18C) after the frame-out of the superimposition target Tr from the angle of view VA is omitted.

The fourth embodiment described above has the same effect as that of the second embodiment, and even if the superimposed display is changed from the non-superimposed content CTn to the superimposed content CTs, these have substantially the same meaning. Therefore, misunderstanding of the driver is less likely to occur. Therefore, it is possible to present highly convenient information.

In addition, in the fourth embodiment, the traffic sign image Pts displayed as the non-superimposed content CTn notifies the driver in advance of the traveling direction set in each lane before reaching the intersection. Therefore, the driver can understand the travelable direction of each lane in advance and change a travelling lane to an appropriate lane.

Further, as in the fourth embodiment, when the non-superimposed content CTn includes an image portion having substantially the same meaning as the superimposed content CTs, the non-superimposed content CTn may include an image portion that presents information different from the superimposed content CTs. As described above, when additional related information is presented by the non-superimposed content CTn at the timing when the distance to the superimposition target Tr is secured, the convenience of the driver can be further improved.

Further, in the fourth embodiment, the transition animation Ats is omitted, the display of the non-superimposed content CTn is turned off, and then the display is switched so that the display of the superposed content CTs is started immediately. According to the adoption of such display switching, for example, in a complicated traffic environment, the display generation unit 77 can easily adjust the display start timing of the superimposed content CTs to a timing at which the driver is unlikely to misunderstand.

Fifth Embodiment

Figure 25:
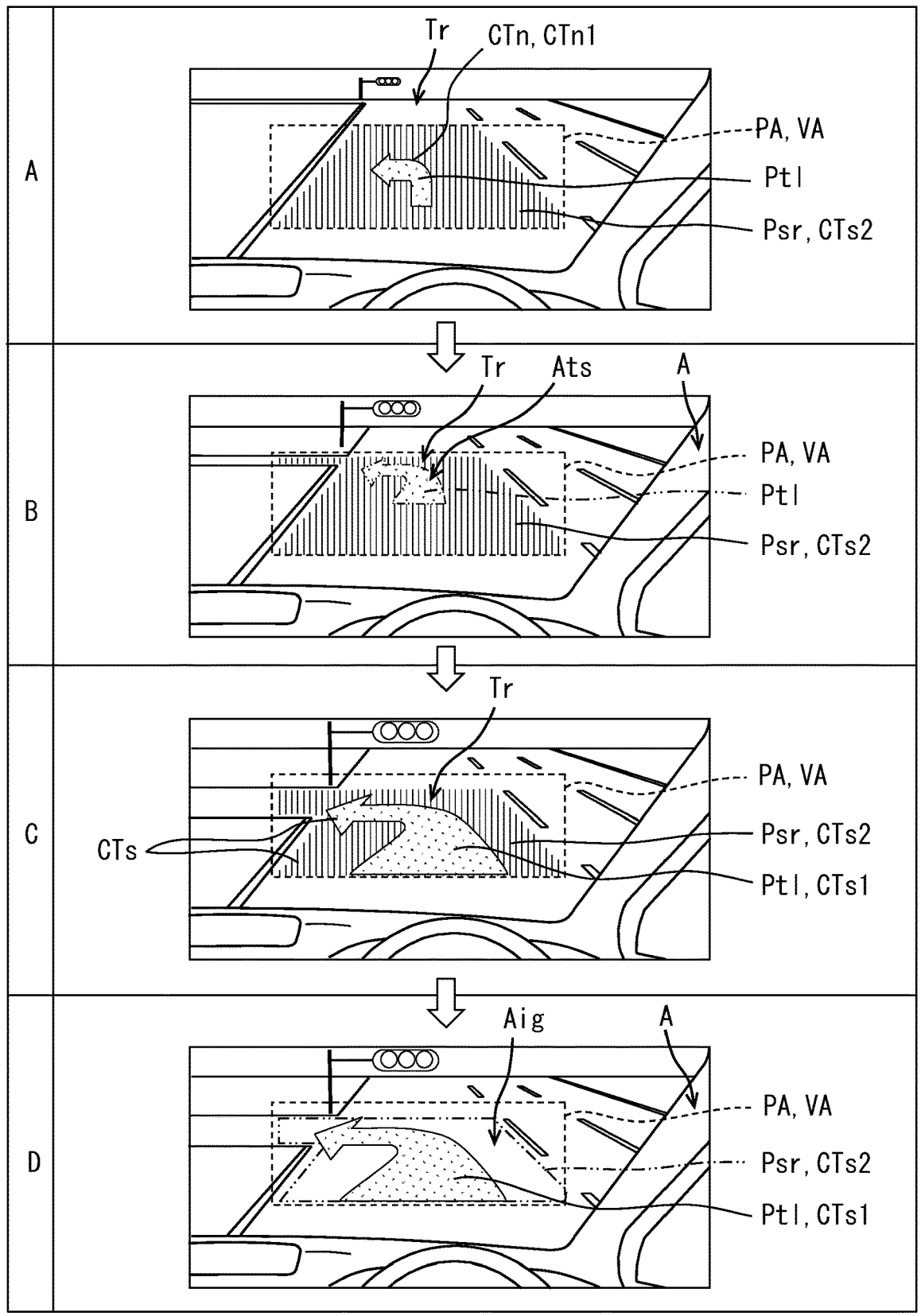
FIG. 25 is a diagram showing a transition of display in the information presentation of the fifth embodiment.
Figure 26:
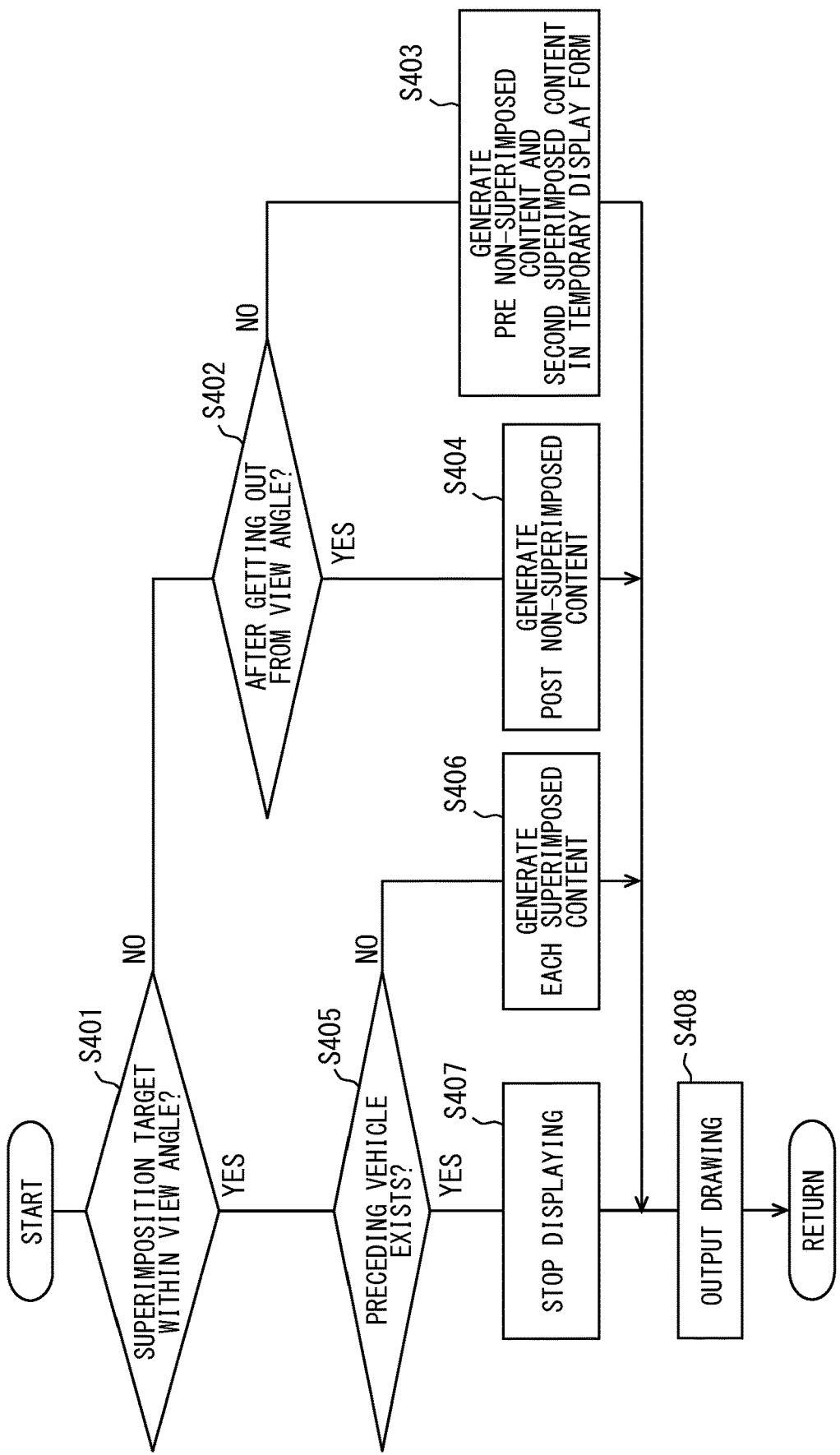
FIG. 26 is a flowchart showing details of the display process of the fifth embodiment.

A fifth embodiment of the present disclosure illustrated in FIGS. 25 and 26 is yet another modification of the second embodiment. Also in the fifth embodiment, the display form of the superimposed content CTs used for the route guidance is different from that of the second embodiment. The display generation unit 77 superimposes and displays the superposed contents CTs having different display forms, that is, the first superposed content CTs1 and the second superposed content CTs2 on a common specific superimposing target Tr (for example, an intersection) (FIG. 25C). Hereinafter, the details of the display transition in the route guidance of the fifth embodiment will be described with reference to FIG. 15 based on FIG. 25.

Based on the acquisition of the guidance execution request by the route information acquisition unit 72, the display generation unit 77 provisionally displays the second superimposed content CTs2 in a non-superimposition manner on the intersection under a condition that the superimposed target Tr (i.e., the intersection) is outside the angle of view VA. The second superimposed content CTs2 is superimposed and displayed on the foreground prior to the display of the first superimposed content CTs1. The second superimposed content CTs2 is a planned route image Psr that causes the road surface of the planned traveling route based on the set route to be lighted. Since the intersection is outside the angle of view VA, the planned route image Psr is superimposed and displayed on the road surface of the own vehicle lane on the front side of the intersection in a temporary display form (see FIG. 25A). As described above, the state in which the original superimposition target Tr is not superimposed is defined as the "temporary display" state. The planned route image Psr has a trapezoidal shape and is displayed in a posture in which the upper edge side is inclined in the depth direction.

In addition, the display generation unit 77 superimposes the left turn image Pt1 as the non-superimposed content CTn (i.e., the pre-non-superimposition content CTn1) on the temporarily displayed second superimposition content CTs2 before displaying the first superimposition content CTs1. (See FIG. 25A). The non-superimposed content CTn is a display object having substantially the same meaning as the first superposed content CTs1. The left turn image Pt1 is displayed in a raised posture with respect to the road surface, and is superimposed on the center of the planned route image Psr. The left turn image Pt1 is visually recognized by the driver on the front side and the upper side of the planned route image Psr. The left turn image Pt1 is superimposed on the planned route image Psr to supplement the left turn guidance function that is insufficient in the planned route image Psr in the provisional display mode.

When the superimposition target Tr enters the angle of view VA, the display generation unit 77 superimposes and displays the planned route image Psr as the formal second superimposition content CTs2 on the superimposition target Tr based on the determination within the angle of view by the target position determination unit 76. Specifically, the display generation unit 77 covers the road surface of the intersection with the planned route image Psr, and then changes the display shape of the planned route image Psr so as to extend toward the road surface at the left turn destination (see FIG. 25B). As described above, the planned route image Psr acquires the function of guiding the left turn.

In addition, the display generation unit 77 starts the display of the transition animation Ats at the timing when the superimposition target Tr enters or is likely to enter the angle of view VA. In the transition animation Ats, the mode of the left turn image Pt1 is changed from the non-superimposed content CTn to the first superposed content CTs1. In the transition animation Ats, the posture of the left turn image Pt1 is gradually tilted toward the traveling direction of the vehicle A so as to stick to the planned route image Psr (see FIG. 25B).

Then, the display size of the left turn image Pt1 having a posture substantially parallel to the planned route image Psr is enlarged. As a result, the left turn image Pt1 is displayed as the first superimposed content CTs1 so as to be superimposed on the entire planned route image Psr (see FIG. 25C). As described above, both the first superimposed content CTs1 and the second superimposed content CTs2 are superimposed and displayed on the superimposed target Tr.

The display generation unit 77 integrates one of the first superimposed content CTs1 and the second superimposed content CTs2 into the other of these. Specifically, in order to integrate the second superimposed content CTs2 into the first superimposed content CTs1, the display generation unit 77 displays an integration animation Aig such that the planned route image Psr is sucked into the left turn image Pt1. Due to the integration animation Aig, the planned path image Psr fades out from the projection range PA. As a result, the function of presenting information for guiding the left turn is integrated in the left turn image Pt1 (see FIG. 25D).

In addition, the display generation unit 77 switches the first superposed content CTs1 to the post-non-superimposed content CTn2 as in the first embodiment (see FIG. 18C) at the timing when the superimposing target Tr goes out of the angle of view VA due to the approach of the intersection of the vehicle A.

In order to realize the information presentation of the fifth embodiment described above, the HCU 100 implements the display process shown in FIG. 26. In S401 and S402 of this display process, the positional relationship of the superimposition target Tr with the angle of view VA is determined, as in S201 and S202 of the second embodiment. Further, in S405, the presence or absence of a vehicle in front is determined, as in S205 of the second embodiment. Further, in S408, similarly to S208 of the second embodiment, a process of outputting the drawing data generated in any of S403, S404, and S406 to HUD20 is performed.

When the superimposition target Tr is in the stage before entering the angle of view VA, the display generation unit 77 performs the process of S403 based on the determinations of S401 and S402. In S403, a frame image in which the pre-non-superimposed content CTn1 (i.e., the left turn image Pt1) is superimposed on the second superimposed content CTs2 (i.e., the scheduled route image Psr) in the provisional display mode is generated (see FIG. 25A). On the other hand, in S404 after the superimposition target Tr comes out of the angle of view VA, a frame image including the post-non-superimposition content CTn2 (see FIG. 18C) is generated.

When the superimposition target Tr is located within the angle of view VA and there is no vehicle Af in front, the display generation unit 77 performs the process of S406 based on the determinations of S401 and S405. In S406, a frame image including the first superimposed content CTs1 and the second superimposed content CTs2 is generated as appropriate (see FIG. 25C). By the processing of S406, the transition animation Ats (see FIG. 25B) and the integrated animation Aig (see FIG. 25D) are sequentially displayed. On the other hand, in S407 when the vehicle in front Af is present, the display of the first superimposed content CTs1 and the second superimposed content CTs2 is stopped. In this case, for example, the display of the pre-non-superimposed content CTn1 is continued.

In the fifth embodiment described above, prior to the display of the first superimposed content CTs1, the non-superimposed content CTn having substantially the same meaning is displayed and superimposed on the second superimposed content CTs2 being temporarily displayed. Therefore, the meaning of the second superimposed content CTs2 in a state of not being superimposed on the superimposed target Tr can be shown to the driver by the non-superimposed content CTn. As a result, even if the information presentation using the HUD 20 having a limited angle of view VA is started at an early stage, the driver's misunderstanding is less likely to occur. Therefore, it is possible to present highly convenient information.

Further, in the fifth embodiment, the second superimposed content CTs2 is integrated with the first superimposed content CTs1 on the display. In this way, the presentation of information to the driver can be simplified by the display change that captures one of the two contents having the same meaning into the other. Therefore, misunderstandings by the driver are unlikely to occur, and highly convenient information can be presented.

Other Embodiments

Although the embodiments of the present disclosure have been described above, the present disclosure should not be understood as being limited to the aforementioned embodiments. The present disclosure can be applied to various embodiments and various combinations thereof, without departing from the spirits of the present disclosure.

Figure 27:
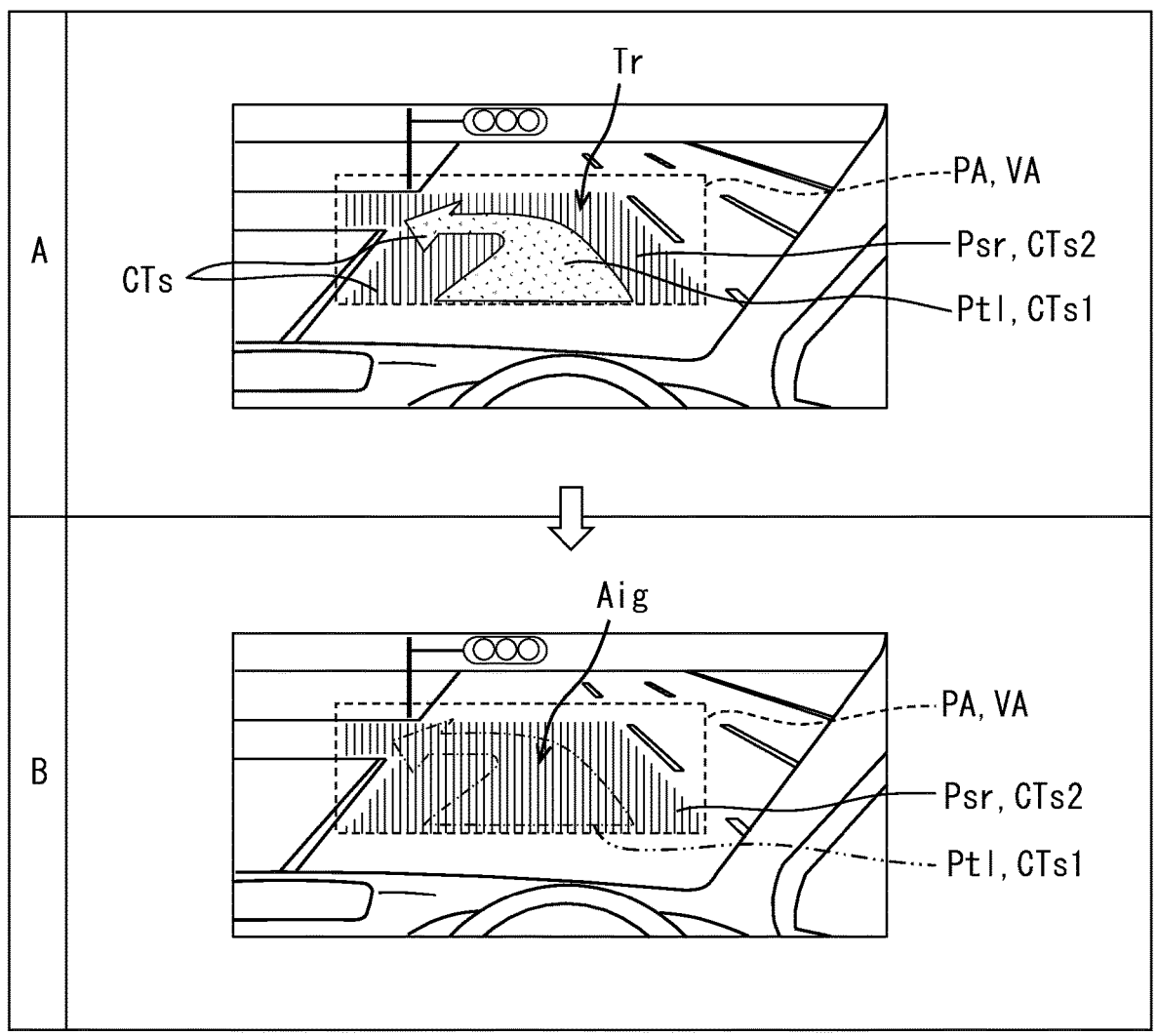
FIG. 27 is a diagram showing a transition of display in the information presentation of the first modification.

Similar to the fifth embodiment, the display generation unit 77 according to the first modification of the fifth embodiment superimposes both the first superimposed content CTs1 (i.e., the left turn image Pt1) and the second superimposed content CTs2 (i.e., the planned route image Psr) on the superimposition target Tr (see FIG. 27A). After that, the display generation unit 77 integrates one of the first superimposed content CTs1 and the second superimposed content CTs2 into the other. In the first modification, unlike the fifth embodiment, the first superimposed content CTs1 is integrated with the second superimposed content CTs2.

Specifically, in the integrated animation Aig of the first modification, the left turn image Pt1 causes a display change that melts into the planned route image Psr. With such an integrated animation Aig, the left turn image Pt1 fades out of the projection range PA. As a result, the function of presenting information for guiding the left turn is integrated in the planned route image Psr (see FIG. 27B). Even in the above-described first modification, the same effect as that of the fifth embodiment is obtained.

Figure 28:
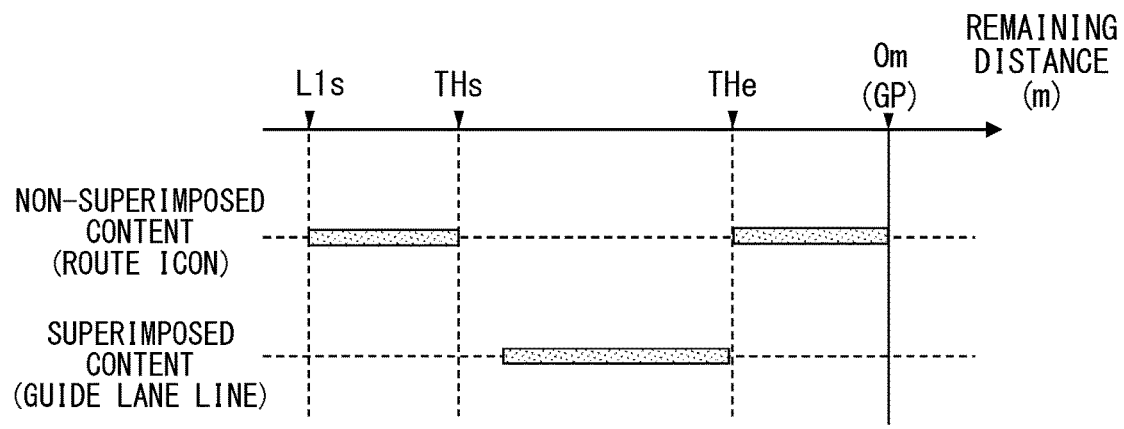
FIG. 28 is a timing chart showing details of transition between non-superimposed content and superposed content in the second modification.

In the second modification of the first embodiment shown in FIG. 28, the display generation unit 77 starts the display of the superimposed content CTs after a predetermined time from the end of the display of the non-superimposed content CTn. As described above, when the display transition from the non-superimposed content CTn to the superposed content CTs is continuously executed, the driver tends to feel busy with the event display object DiE that is normally displayed. Further, the driver's attention may be attracted to the angle of view VA that always displays the event display object DiE, and the confirmation of the surrounding situation may be neglected.

In response to such a difficulty, the display generation unit 77 of the modified example 2 performs initial route guidance using the route icon Prg as in the first embodiment, and conveys the necessity of turning left or right. After that, when the remaining distance Dr reaches the superposition threshold value THs, the display generation unit 77 ends the display of the route icon Prg and waits for the elapse of a predetermined time. Then, the display generation unit 77 starts displaying the guide marking line Pg1 after the elapse of a predetermined time.

As described above, if a suspension period in which the event display object DiE is not displayed is provided after the display of the route icon Prg is completed, this suspension period can effectively function as a period for prompting confirmation of the peripheral situation of the driver. That is, by setting the suspension period, the driver can appropriately grasp an object and a pedestrian that may be involved. As a result, the virtual image display can contribute to smooth running at an intersection or the like where the route is guided. The predetermined time is set to a time suitable for confirming the surrounding situation (for example, about several seconds).

Figure 29:
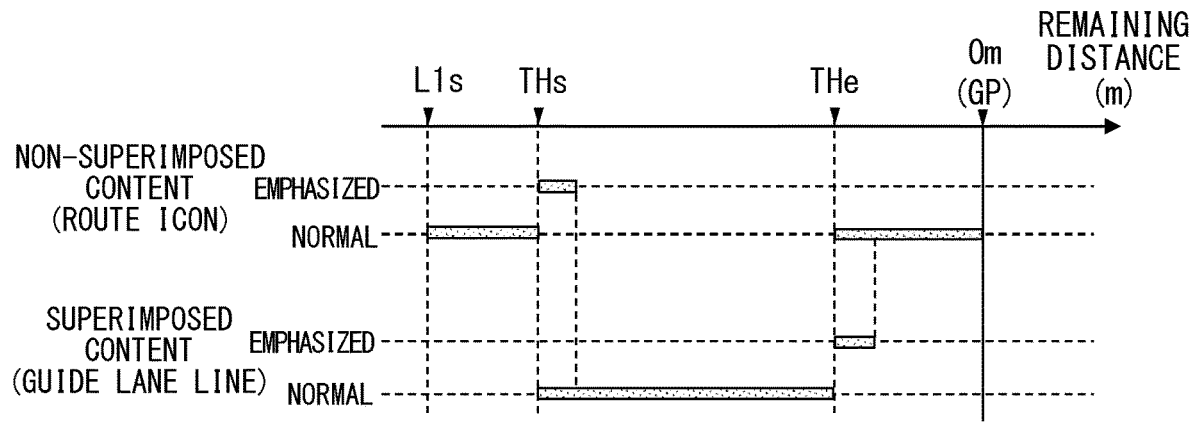
FIG. 29 is a timing chart showing details of transition between non-superimposed content and superposed content in the third modification.

In the third modification of the first embodiment shown in FIG. 29, the display generation unit 77 changes the mode of emphasizing the non-superimposed content CTn at the time of transition from the non-superimposed content CTn to the superposed content CTs, and then the display of the non-superimposed content CTn is finished. Further, the display generation unit 77 also terminates the display of the superimposed content CTs after changing the mode for emphasizing the superimposed content CTs when shifting from the superimposed content CTs to the non-superimposed content CTn. Such content highlighting can inform the driver of the occurrence of transition between non-superimposed content CTn and superposed content CTs in an easy-to-understand manner.

In the above modification 3, the mode change for emphasizing the content can be changed as appropriate. Further, the mode change for emphasizing the non-superimposed content CTn and the mode change for emphasizing the superimposed content CTs may be different from each other.

Specifically, the content is emphasized by a method such as temporarily increasing the display brightness of the content, changing the display color or display size, or blinking the content. Further, with respect to the map form image or the like, a mode change such as changing the viewpoint position of the image view, zooming in or out may be performed as the above highlighting.

In the fourth modification of the first embodiment, the display generation unit 77 controls the start timing and content switching timing of the information presentation based on the expected arrival time until the vehicle A reaches the superimposition target Tr instead of the distance from the vehicle A to the superimposition target Tr. More specifically, the virtual layout unit 75 of the modified example 4 grasps the time required to reach the reference position GP (i.e., the specific position). Specifically, the virtual layout unit 75 acquires the current traveling speed of the vehicle A together with the remaining distance Dr to the reference position GP. The virtual layout unit 75 acquires the remaining time to the reference position GP by dividing the remaining distance Dr by the speed.

Further, the display generation unit 77 sets the time corresponding to the first start distance Lis, the first end distance Lie, the second start distance L2s, the second end distance L2e, the superposition threshold THs, and the end threshold TH of the first embodiment. The display generation unit 77 determines the display start and display end of each content based on the fact that the remaining time grasped by the virtual layout unit 75 is less than the time that is each threshold value. Even in such a modification 4, the display generation unit 77 can superimpose and display the superposed content CTs on the superimposing target Tr based on the fact that the remaining time is less than the superimposing threshold value THs.

In the modified example 5 of the first embodiment, the display generation unit 77 adjusts the line width of the guide lane marking line Pg1 so that the guide lane marking line Pg1 superimposed on the road surface of the exit road is always one line. Specifically, the display generation unit 77 appropriately enlarges the line width of the guide division line Pg1, and draws the thickened linear image units so that the tip portions thereof overlap each other. For example, the driver visually recognizes the curve as a single line. Therefore, if the guide lane marking line Pg1 is changed into a single line by adjusting the thickness, the driver can appropriately recognize the curve shape of the planned route indicated by the guide lane marking line Pg1. Further, in the modification 6 of the above embodiment, the adjustment of the line width of the guide lane marking line Pg1 may not be substantially performed.

In the modified example 7 of the second embodiment, the display generation unit 77 in addition to making the superimposed content CTs into an avoidance shape when the detection information of the preceding vehicle Af is acquired by the external information acquisition unit 74, the transition animation Ats is stopped to be displayed. According to the above, the period during which the transition animation Ats overlaps with the vehicle in front Af can be reduced. Further, by omitting the transition animation Ats, the superimposed content CTs having a perfect shape is immediately displayed, so that the driver can easily recognize the planned route.

In the modified example 8 of the above embodiment, the display generation unit 77 determines whether or not to carry out the display transition from the non-superimposed content CTn to the superposed content CTs based on the road shape in the front range including the intersection. For example, when the shape of an intersection in the front range is complicated, when passing through consecutive intersections in a complex manner, or when high-precision map data is insufficient, the display generation unit 77 estimates that there is a possibility of causing difficulty with the superimposed display of the virtual image Vi, and continues displaying the non-superimposed content CTn. In this case, the non-superimposed content CTn is moved to the center of the angle of view VA.

In the modified example 9 of the fourth embodiment, the plurality of traffic sign images Pts are displayed as the non-superimposed content CTn in the traveling scene that continuously passes through the plurality of intersections. Each traffic sign image Pts shows lane information at each intersection. The traffic sign images Pts are displayed side by side from the vicinity of the lower edge of the projection range PA to the upper side in order from the one showing the lane information of the intersection near the vehicle A.

In the modified example 10 of the second embodiment, the target position determination unit 76 determines whether or not the superimposition target Tr is within the angle of view VA based on the imaging data of the front camera 31. Specifically, the target position determination unit 76 specifies a target range in which the superimposition target Tr is captured in the front image, and when the target range is within a predetermined area of the front image, it is determined that the superimposition target Tr is disposed within the view angle VA. As in the above modification 10, the method of determining the angle of view can be changed as appropriate.

The driving scene in which the information presentation is illustrated in the description of the above embodiment and the modified example is an example. The HCU 100 presents information in combination with non-superimposed content CTn and superposed content CTs in a driving scene different from the above. For example, the display mode of the content used for presenting information is appropriately changed. As an example, the traffic sign image Pts displayed as the non-superimposed content CTn may be an image imitating a road sign different from the speed limit sign and the sign of the traffic division according to the traveling direction. In addition, the guidance image used for route guidance is not limited to the left turn image Pt1 and the planned route image Psr. Further, regardless of the presence or absence of the vehicle Af in front, the shape of the left turn image Pt1 displayed as the superimposed content CTs may be fixed to one of the "two strip-shaped lines" of the first embodiment and the "arrow shape" of the second embodiment. Further, each threshold value that defines the display start position (or timing) and the display end position (or timing) of the non-superimposed content CTn and the superimposed content CTs may be arbitrarily adjusted by presetting by the driver or the like.

The shape, emission color, display position, etc. of each image displayed as a virtual image Vi may be changed as appropriate. Further, the animation used when switching the contents may be contents in which effects such as rotation, enlargement and reduction, movement, discoloration, and deformation are appropriately combined so that a smooth transition of the display state is possible. In addition, the mode of the display transition between the non-superimposed content CTn and the superposed content CTs can be changed as appropriate. For example, after displaying both the pre-non-superimposed content CTn1 and the superposed content CTs in the angle of view VA, a display transition such that the pre-non-superimposed content CTn1 is erased can be performed. Similarly, after displaying both the superposed content CTs and the post-non-superimposed content CTn2 in the angle of view VA, it is possible to carry out a display transition in which the superposed content CTs is erased.

The HCU 100 of the above embodiment sequentially controls the projection shape and projection position of the virtual image light for forming the superimposed content using the position information of the eye point EP detected by the DSM 27 so that the superimposed content is superimposed on the superimposed object without deviation when viewed from the driver. Alternatively, the HCU 100 of the modified example 11 of the above embodiment does not use the detection information of the DSM 27, but uses the setting information of the center of the reference eye point set in advance, and controls the projection shape and projection position of the virtual image light for forming the superimposed content using the setting information.

In the modified example 12 of the above embodiment, a user terminal such as a smartphone is connected to the in-vehicle network 1. For the application executed on the user terminal, a route to the destination is set by a user operation such as a driver. The user terminal provides the route information to the destination, the related navigation map data, and the like to the route information acquisition unit 72 through the in-vehicle network or the like.

Further, the route information acquisition unit 72 of the modified example 13 of the above embodiment can acquire route information, navigation map data, and the like from a server on the cloud through the vehicle-external network. The navigation device 50 may not be mounted on the vehicle A as long as the information necessary for route guidance can be acquired from the smartphone or the cloud server as in the above modified examples 12 and 13.

The HUD projector 21 of the modified example 14 is provided with an EL (Electro Luminescence) panel instead of the LCD panel and the backlight. Further, instead of the EL panel, a projector using a display such as a plasma display panel, a cathode ray tube and an LED can be adopted for the HUD.

The HUD of the modified example 15 is provided with a laser module (hereinafter referred to as "LSM") and a screen instead of the LCD and the backlight. The LSM includes, for example, a laser light source, a MEMS (Micro Electro Mechanical Systems) scanner, and the like. The screen is, for example, a micromirror array or a microlens array. In the HUD 20 of the modification 15, a display image is drawn on the screen by scanning the laser beam emitted from the LSM. The HUD 20 projects the display image drawn on the screen onto the windshield by the magnifying optical element, and displays the virtual image Vi in the air.

Further, the HUD of the modified example 16 is provided with a DLP (Digital Light Processing, registered trademark) projector. A DLP projector has a digital mirror device (hereinafter, "DMD") provided with a large number of micromirrors, and a projection light source that projects light toward the DMD. The DLP projector draws a display image on the screen under the control of linking the DMD and the projection light source. Further, in the HUD of the modification example 17, a projector using LCOS (Liquid Crystal On Silicon) is adopted. Furthermore, in the HUD of the modified example 18, a holographic optical element is adopted as one of the optical systems for displaying the virtual image Vi in the air.

In the modified example 19 of the above embodiment, the HCU 100 and the HUD 20 are integrally configured. That is, the processing function of the HCU 100 is mounted on the control circuit of the HUD 20 of the modified example 19.

In the aforementioned embodiments, the respective functions provided by the in-vehicle HCU 100 can be also provided by software and hardware for executing the software, only software, only hardware, and complex combinations of them. In cases where these functions are provided by electronic circuits as hardware, the respective functions can be also provided by analog circuits or digital circuits which include a large number of logic circuits.

Further, the form of the storage medium for storing the program or the like capable of realizing the above display control method may be changed as appropriate. For example, the storage medium is not limited to the configuration provided on the circuit board, and may be provided in the form of a memory card or the like, inserted into the slot portion, and electrically connected to the control circuit of the HCU. The storage medium may be also constituted by an optical disk which forms a source of programs to be copied into a HCU, a hard disk drive therefor, and the like.

The vehicle equipped with the HMI system is not limited to a general private car, but may be a vehicle for rent-a-car, a vehicle for a manned taxi, a vehicle for ride sharing, a freight vehicle, a bus, or the like. Further, the HMI system and the HCU may be mounted on a vehicle dedicated to unmanned driving used for mobility services. Further, the vehicle equipped with the HMI system may be a right-hand drive vehicle or a left-hand drive vehicle. Further, the display form of each content is appropriately optimized according to the steering wheel position of the vehicle and the like.

The control unit and the method thereof described in the present disclosure are realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

The present disclosure has been described in accordance with the embodiment. However, it is to be understood that the present disclosure is not limited to the embodiment and structure. The present disclosure also encompasses various modifications and variations within an equivalent range. In addition, various combinations and forms, and further, other combinations and forms including only one element, or more or less than these elements are also within the sprit and the scope of the present disclosure.

What is claimed is:

1. A display control device for a vehicle to control a display on a head-up display, the display control device comprising:

a display generation unit that generates a superimposed content to be superimposed and displayed on a specific superimposition target disposed in a foreground of the vehicle and a non-superimposed content to be superimposed and displayed on the foreground in a non-superimposed state in which a display position is not connected to the superimposition target; and a target position grasping unit that grasps a distance to a specific position related to the superimposition target or a time until reaching the specific position, wherein:

the display generation unit displays the non-superimposed content having a same meaning as the superimposed content before displaying the superimposed content;

the display generation unit superimposes and displays the superimposed content on the superposition target based on a condition that the distance or the time grasped by the target position grasping unit is less than a threshold value; and the display generation unit starts displaying the superimposed content when the display of the non-superimposed content is finished, displays a transition animation for transitioning a display state from the non-superimposed content to the superimposed content, and displays the transition animation in which the non-superimposed content moving toward the superimposition target changes to the superimposed content.

2. The display control device according to claim 1, wherein:
the display generation unit displays and superimposes the superimposed content on the superimposition target when the distance or the time is less than a threshold value which is set based on a view angle shape of the head-up display.

3. The display control device according to claim 1, wherein:
the display generation unit ends the display of the non-superimposed content after starting the display of the superimposed content.

4. The display control device according to claim 1, wherein:
the display generation unit starts displaying the superimposed content after a predetermined time has elapsed after finishing the display of the non-superimposed content.

5. The display control device according to claim 1, further comprising:
a front information acquisition unit that acquires detection information of a preceding vehicle, wherein:
the display generation unit stops displaying the transition animation when the front information acquisition unit acquires the detection information of the preceding vehicle.

6. The display control device according to claim 5, wherein:
the display generation unit changes a display shape of the superimposed content to be an avoidance shape that avoids the preceding vehicle when the front information acquisition unit acquires the detection information of the preceding vehicle.

7. The display control device according to claim 1, further comprising:
a front information acquisition unit that acquires detection information of a preceding vehicle.

8. The display control device according to claim 1, wherein:
the display generation unit ends the display of the non-superimposed content after switching to a display mode for emphasizing the non-superimposed content.

9. The display control device according to claim 1, further comprising:
a route information acquisition unit that acquires route information for route guidance, wherein:
the display generation unit displays a traveling direction set in each of a plurality of traffic lanes as the non-superimposed content when performing the route guidance at an intersection including the plurality of traffic lanes based on the route information.

10. The display control device according to claim 1, wherein:
after displaying the superposed content, the display generation unit displays a post non-superimposed content that has a same meaning as the superimposed content, and has a display form different from a pre-non-superimposed content as the non-superimposed content.

11. A display control device for a vehicle to control a display on a head-up display, the display control device comprising:
a display generation unit that generates a superimposed content to be superimposed and displayed on a specific superimposition target disposed in a foreground of the vehicle and a non-superimposed content to be superimposed and displayed on the foreground in a non-superimposed state in which a display position is not connected to the superimposition target; and
a target position determination unit that determines whether the superimposition target is disposed within a view angle of the head-up display, wherein:
the display generation unit displays the non-superimposed content having a same meaning as the superimposed content before displaying the superimposed content;
the display generation unit superimposes and displays the superimposed content on the superposition target based on a condition that the target position determination unit determines that the superimposition target is disposed within the view angle; and
the display generation unit starts displaying the superimposed content when the display of the non-superimposed content is finished, displays a transition animation for transitioning a display state from the non-superimposed content to the superimposed content, and displays the transition animation in which the non-superimposed content moving toward the superimposition target changes to the superimposed content.

12. The display control device according to claim 11, wherein:
the display generation unit displays and superimposes the non-superimposed content having the same meaning as the superimposed content before displaying the superimposed content target based on a condition that the target position determination unit determines that the superimposition target is disposed within the view angle.

13. The A display control device for a vehicle to control a display on a head-up display, the display control device comprising:
a display generation unit that generates a superimposed content to be superimposed and displayed on a specific superimposition target disposed in a foreground of the vehicle and a non-superimposed content to be superimposed and displayed on the foreground in a non-superimposed state in which a display position is not connected to the superimposition target;

a target position grasping unit that grasps a distance to a specific position related to the superimposition target or a time until reaching the specific position; and a front information acquisition unit that acquires detection information of a preceding vehicle;

wherein:

the display generation unit displays the non-superimposed content having a same meaning as the superimposed content before displaying the superimposed content;

the display generation unit-superimposes and displays the superimposed content on the superposition target based on a condition that the distance or the time grasped by the target position grasping unit is less than a threshold value;

the display generation unit displays the non-superimposed content before displaying the superimposed content when the front information acquisition unit does not acquire the detection information of the preceding vehicle; and the display generation unit displays the non-superimposed content after the display of the superimposed content when the front information acquisition unit acquires the detection information of the preceding vehicle.

14. A non-transitory tangible computer readable medium comprising instructions being executed by a computer, the instructions being used in a vehicle to control a display on a heads-up display and executed by at least one processor, the instructions including:

before displaying a superimposed content to be superimposed and displayed on a specific superimposition object disposed in a foreground of the vehicle, displaying and superimposing a non-superimposed content, having a same meaning as the superimposed content, on the foreground in a non-superimposed state in which a display position is not connected to the superimposition target;

grasping a distance to a specific position related to the superposition target or a time to reach the specific position;

when the distance or the time is less than a threshold value, displaying and superimposing the superimposed content on the superimposition target;

starting display of the superimposed content when the display of the non-superimposed content is finished;

displaying a transition animation for transitioning a display state from the non-superimposed content to the superimposed content; and displaying the transition animation in which the non-superimposed content moving toward the superimposition target changes to the superimposed content.

15. A non-transitory tangible computer readable medium comprising instructions being executed by a computer, the instructions being used in a vehicle to control a display on a heads-up display and executed by at least one processor, the instructions including:

before displaying a superimposed content to be superimposed and displayed on a specific superimposition object disposed in a foreground of the vehicle, displaying and superimposing a non-superimposed content, having a same meaning as the superimposed content, on the foreground in a non-superimposed state on the superimposition target;

when the superposition target is disposed in a view angle of the head-up display, displaying and superimposing the superposed content on the superposition target;

starting display of the superimposed content when the display of the non-superimposed content is finished;

displaying a transition animation for transitioning a display state from the non-superimposed content to the superimposed content; and displaying the transition animation in which the non-superimposed content moving toward the superimposition target changes to the superimposed content.

* * * * *